(12) United States Patent
Ohashi et al.

(10) Patent No.: US 7,844,896 B2
(45) Date of Patent: Nov. 30, 2010

(54) LAYOUT-RULE GENERATION SYSTEM, LAYOUT SYSTEM, LAYOUT-RULE GENERATION PROGRAM, LAYOUT PROGRAM, STORAGE MEDIUM, METHOD OF GENERATING LAYOUT RULE, AND METHOD OF LAYOUT

(75) Inventors: Hirotaka Ohashi, Suwa (JP); Toshio Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1449 days.

(21) Appl. No.: 11/089,001

(22) Filed: Mar. 24, 2005

(65) Prior Publication Data

US 2005/0223319 A1    Oct. 6, 2005

(30) Foreign Application Priority Data

Mar. 31, 2004   (JP)   ............................. 2004-104985
Nov. 29, 2004   (JP)   ............................. 2004-344176

(51) Int. Cl.
*G06F 17/00*   (2006.01)

(52) U.S. Cl. ....................... 715/243; 715/244; 715/247; 715/252; 715/253

(58) Field of Classification Search .................... 716/11
See application file for complete search history.

(56) References Cited

U.S. PATENT DOCUMENTS 5,877,774 A   3/1999   Saito
7,124,359 B2   10/2006   Suzuki et al.
7,272,789 B2 *   9/2007   O'Brien ...................... 715/247
7,395,510 B2 *   7/2008   Diwan et al. ................. 715/801
2006/0150091 A1   7/2006   Suzuki et al.

FOREIGN PATENT DOCUMENTS

| JP | A-62-086465 | 4/1987 |
| JP | A-05-159101 | 6/1993 |
| JP | A-06-223061 | 8/1994 |
| JP | A-08-044883 | 2/1996 |
| JP | A-08-096153 | 4/1996 |
| JP | A-09-062850 | 3/1997 |
| JP | A-09-200496 | 7/1997 |
| JP | A-11-091189 | 4/1999 |
| JP | A-11-202762 | 7/1999 |

* cited by examiner

*Primary Examiner*—Doug Hutton
*Assistant Examiner*—James H Blackwell
(74) *Attorney, Agent, or Firm*—Oliff & Berridge, PLC

(57) ABSTRACT

The invention provides a layout-rule generation system suitable for reflecting the layout of an existing document to the result of automatic layout. A layout unit can generate a layout rule on the basis of the positional relationship of at least two of multiple split regions in an electronic document and generate a layout template on the basis of the electronic document and register the generated template in a template registration DB in association with the generated layout rule. The layout unit can select layout elements from a layout-element registration DB and arranges the selected layout elements in the layout region according to the layout rule and the layout template generated for the same electronic document.

11 Claims, 19 Drawing Sheets

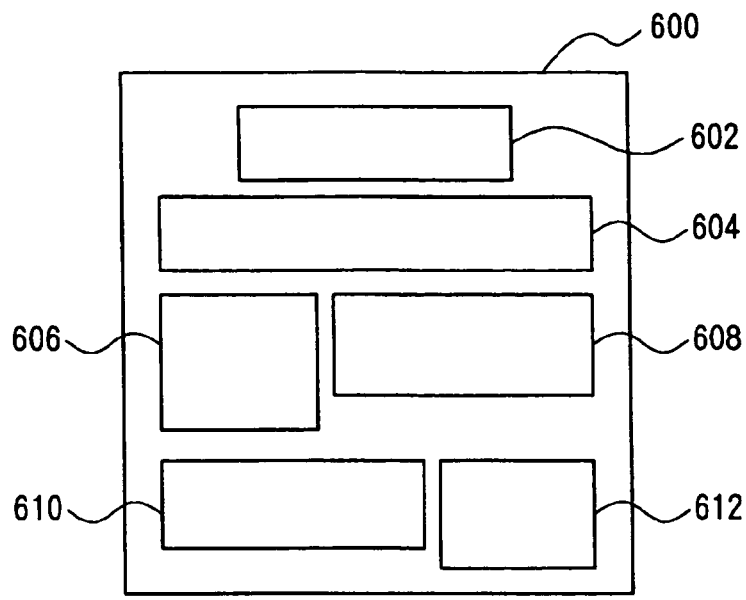

FIG. 3

| OBJECT REGION | DESCRIPTION OF RULE | PRIORITY |
|---|---|---|
| CHARACTER REGION A<br>CHARACTER REGION B | ALIGN x-COORDINATE OF THE CENTERS OF REGIONS | 5 |
| CHARACTER REGION B<br>PHOTOGRAPH REGION C<br>CHARACTER REGION E | ALIGN x-COORDINATE OF THE LEFT SIDES OF REGIONS | 1 |
| CHARACTER REGION B<br>CHARACTER REGION D<br>FIGURE REGION F | ALIGN x-COORDINATE OF THE RIGHT SIDES OF REGIONS | 3 |
| PHOTOGRAPH REGION C<br>CHARACTER REGION D | ALIGN y-COORDINATE OF THE UPPER SIDES OF REGIONS | 2 |
| CHARACTER REGION E<br>FIGURE REGION F | ALIGN y-COORDINATE OF THE UPPER SIDES OF REGIONS | 2 |

| | | | REGION A | | | REGION B | | | REGION C | | | REGION D | | | REGION E | | | REGION F | | |
|---|---|---|---|---|---|---|---|---|---|---|---|---|---|---|---|---|---|---|---|---|
| | | | CENTER | UPPER LEFT | UPPER RIGHT | CENTER | UPPER LEFT | UPPER RIGHT | CENTER | UPPER LEFT | UPPER RIGHT | CENTER | UPPER LEFT | UPPER RIGHT | CENTER | UPPER LEFT | UPPER RIGHT | CENTER | UPPER LEFT | UPPER RIGHT |
| REGION A | CENTER | DISTANCE | | | | | | | | | | | | | | | | | | |
| | | ANGLE | | | | | | | | | | | | | | | | | | |
| | UPPER LEFT | DISTANCE | | | | | | | | | | | | | | | | | | |
| | | ANGLE | | | | | | | | | | | | | | | | | | |
| | UPPER RIGHT | DISTANCE | | | | | | | | | | | | | | | | | | |
| | | ANGLE | | | | | | | | | | | | | | | | | | |
| REGION B | CENTER | DISTANCE | | | | | | | | | | | | | | | | | | |
| | | ANGLE | | | | 270 | | | | | | | | | | | | | | |
| | UPPER LEFT | DISTANCE | | | | | | | | | | | | | | | | | | |
| | | ANGLE | | | | | | | | | | | | | | | | | | |
| | UPPER RIGHT | DISTANCE | | | | | | | | | | | | | | | | | | |
| | | ANGLE | | | | | | | | | | | | | | | | | | |
| REGION C | CENTER | DISTANCE | | | | | | | | | | | | | | | | | | |
| | | ANGLE | | | | | | | | | | | | | | | | | | |
| | UPPER LEFT | DISTANCE | | | | | | | 270 | | | | | | | | | | | |
| | | ANGLE | | | | | | | | | | | | | | | | | | |
| | UPPER RIGHT | DISTANCE | | | | | | | | | | | | | | | | | | |
| | | ANGLE | | | | | | | | | | | | | | | | | | |
| REGION D | CENTER | DISTANCE | | | | | | | | | | | | | | | | | | |
| | | ANGLE | | | | | | | | | | | | | | | | | | |
| | UPPER LEFT | DISTANCE | | | | | | | | | | | | | | | | | | |
| | | ANGLE | | | | | | | | | | | | | | | | | | |
| | UPPER RIGHT | DISTANCE | | | | | | | | | | 270 | | | | | | | | |
| | | ANGLE | | | | | | | | | | | | | | | | | | |
| REGION E | CENTER | DISTANCE | | | | | | | | | | | | | | | | | | |
| | | ANGLE | | | | | | | | | | 0 | | | 270 | | | | | |
| | UPPER LEFT | DISTANCE | | | | | | | | | | | | | | | | | | |
| | | ANGLE | | | | | | | | | | | | | | | | 270 | | |
| | UPPER RIGHT | DISTANCE | | | | | | | | | | | | | | | | | | |
| | | ANGLE | | | | | | | | | | | | | | | | | | 0 |

|  |  |  | REGION A | | | REGION B | | | REGION C | | |
|---|---|---|---|---|---|---|---|---|---|---|---|
|  |  |  | CENTER | UPPER LEFT | UPPER RIGHT | CENTER | UPPER LEFT | UPPER RIGHT | CENTER | UPPER LEFT | UPPER RIGHT |
| REGION A | CENTER | DISTANCE |  |  |  | 5 |  |  | 12 |  |  |
|  |  | ANGLE |  |  |  | 300 |  |  | 300 |  |  |
|  | UPPER LEFT | DISTANCE |  |  |  |  |  |  |  |  |  |
|  |  | ANGLE |  |  |  |  |  |  |  |  |  |
|  | UPPER RIGHT | DISTANCE |  |  |  |  |  |  |  |  |  |
|  |  | ANGLE |  |  |  |  |  |  |  |  |  |
| REGION B | CENTER | DISTANCE |  |  |  |  |  |  | 7 |  |  |
|  |  | ANGLE |  |  |  |  |  |  | 300 |  |  |
|  | UPPER LEFT | DISTANCE |  |  |  |  |  |  |  |  |  |
|  |  | ANGLE |  |  |  |  |  |  |  |  |  |
|  | UPPER RIGHT | DISTANCE |  |  |  |  |  |  |  |  |  |
|  |  | ANGLE |  |  |  |  |  |  |  |  |  |

| | | REFERENCE POINT A | REGION B | | | REGION C | | | REGION D | | | REGION E | | |
|---|---|---|---|---|---|---|---|---|---|---|---|---|---|---|
| | | | CENTER | UPPER LEFT | UPPER RIGHT | CENTER | UPPER LEFT | UPPER RIGHT | CENTER | UPPER LEFT | UPPER RIGHT | CENTER | UPPER LEFT | UPPER RIGHT |
| REFERENCE POINT A | DISTANCE | | 10 | | | 10 | | | 10 | | | 10 | | |
| | ANGLE | | 30 | | | 135 | | | 240 | | | 300 | | |
| REGION B | CENTER | DISTANCE | | | | | | | | | | | | |
| | | ANGLE | | | | | | | | | | | | |
| | UPPER LEFT | DISTANCE | | | | | | | | | | | | |
| | | ANGLE | | | | | | | | | | | | |
| | UPPER RIGHT | DISTANCE | | | | | | | | | | | | |
| | | ANGLE | | | | | | | | | | | | |
| REGION C | CENTER | DISTANCE | | | | | | | | | | | | |
| | | ANGLE | | | | | | | | | | | | |
| | UPPER LEFT | DISTANCE | | | | | | | | | | | | |
| | | ANGLE | | | | | | | | | | | | |
| | UPPER RIGHT | DISTANCE | | | | | | | | | | | | |
| | | ANGLE | | | | | | | | | | | | |
| REGION D | CENTER | DISTANCE | | | | | | | | | | | | |
| | | ANGLE | | | | | | | | | | | | |
| | UPPER LEFT | DISTANCE | | | | | | | | | | | | |
| | | ANGLE | | | | | | | | | | | | |
| | UPPER RIGHT | DISTANCE | | | | | | | | | | | | |
| | | ANGLE | | | | | | | | | | | | |

LAYOUT-RULE GENERATION SYSTEM, LAYOUT SYSTEM, LAYOUT-RULE GENERATION PROGRAM, LAYOUT PROGRAM, STORAGE MEDIUM, METHOD OF GENERATING LAYOUT RULE, AND METHOD OF LAYOUT

BACKGROUND

Aspects of the invention can relate to a system, a program, and a method for generating a layout rule. In particular, the invention can relate to a system for generating a layout rule, a layout system, a grogram for generating a layout rule, a layout program, a storage medium, a method of generating a layout rule, and a layout method, which are suitable for reflecting the layout of an existing document to the result of automatic layout.

Related art techniques of automatic layout to provide a document-image region splitting method is disclosed are disclosed in, for example JP-A-62-86465, and a document-logic-structure recognition system is disclosed in, for example JP-A-5-159101.

The invention described in JP-A-62-86465 includes the step of extracting a rectangle that circumscribes each connected component in a document image including a character region and a figure or photograph region, the step of determining a mean size of a character-circumscribing rectangle constructing a vertical or lateral character string from the adjacency relationship of the circumscribing rectangles, and the step of discriminating the character region from the figure or photograph region other than the character region, with reference to the mean size.

In the invention described in JP-A-5-159101, a document image inputted by an input section is split into multiple elements by a document-image splitting section. A matching processing section investigates to which of structure models defined in a structure-model management section the relationship between the elements in the inputted document image matches to determine to which of the logic-structure elements in the structure models each element corresponds. A contents recognition section performs contents recognition with the attributes of the logic-structure elements of the corresponding structure model recognized by the matching processing section as parameters.

SUMMARY

In automatic layout, for example, designers etc. design several layout models in advance and then perform layout based on the layout models, because routine layout may damage ease of view and appearance. Specifically speaking, a layout template that specifies a layout in which multiple information storage frames are arranged in a specified layout region is produced in advance, and at a layout job, layout elements (e.g., character information and image information) being laid out are stored in each information storage frame according to the layout template and as such, the layout elements are arranged in the layout region.

However, it takes much time and labor to produce layout templates manually one by one. Accordingly, it is convenient to extract a layout from an existing laid-out document to form a layout template automatically. For example, the following method of generating a layout template is conceivable: an existing document is read with a scanner etc. to generate a document image and then the document image is segmented in the unit of regions in which the layout elements are arranged and, for each of the split regions, an information storage frame corresponding to its size and layout position is generated.

However, when a new layout element is laid out according to the layout template thus generated, the size or layout position of the information storage frame can be changed depending on the amount of information of the layout element. As a result, for example, a document that is the original of the layout template has two layout elements aligned center, while a layout result obtained by laying out a new layout element may not be aligned center. This can pose the problem that the layout of an original document cannot be suitably reflected to the result of automatic layout.

In the invention described in JP-A-62-86465, a document image is merely split into a character region and a photograph region, so that it is difficult to solve the above problems.

In the invention described in JP-A-5-159101, a structure model that matches the logic structure of a document image is merely determined and the contents of the document image are recognized, so that it is also difficult to solve the above problems.

Aspects of the invention are made in view of the unsolved problems of the related art techniques. Accordingly, it is an object of the invention to provide a system for generating a layout rule, a layout system, a program for generating a layout rule, a layout program, a storage medium, a method of generating a layout rule, and a layout method, which are suitable for reflecting the layout of an existing document to the result of automatic layout.

In order to suitably reflect the layout of an existing document to the result of automatic layout in accordance with a layout template, it can be desirable to generate a layout rule applied to the existing document from the document and arrange layout elements in accordance with the generated layout rule and the layout template.

An exemplary layout-rule generation system of JP-A-62-86465 is provided which generates a layout rule on the basis of an electronic document in which a specified layout region is divided into a plurality of segmented regions. The system can include layout-rule generation device for generating the layout rule on the basis of the positional relationship between at least two of the plurality of segmented regions. With such a structure, a layout rule is generated by the layout-rule generation device on the basis of the positional relationship between at least two of the plurality of segmented regions. This can offer the advantage that a layout rule applied to an electronic document can be generated relatively easily. The use of the generated layout rule in combination with a layout template for the layout of layout elements also offers the advantage that the layout of the electronic document can be reflected to the layout result in a relatively appropriate manner.

Here, the electronic document may have any data structures in which the layout region is segmented, for example, the layout region may be actually divided or logically divided. In the latter case, for example, the coordinate information of the layout elements can be stored in the format of the electronic document. Thus, the split state of the electronic document can be determined from the format of the electronic document. The same is applied to other exemplary layout systems of the invention, exemplary layout-rule generation programs of the invention, the layout program of the invention, the storage mediums of the invention, exemplary layout-rule generation methods of the invention, and exemplary layout method of the invention.

The split region denotes a region in which a layout element is arranged, which may have the same size as a layout element in which the entire layout element is contained, or may not contain the entire layout element but part of the layout element, or alternatively, may contain part or all of the layout element and its surrounding region. The same can be applied to the other aspects of the invention.

The layout element includes character information, image information, and other components of layout. The same can be applied to other aspects of the invention.

In the above exemplary layout-rule generation system, the layout region has two sides parallel to a first direction and two sides parallel to a second direction perpendicular to the first direction as outer periphery. When it is determined that virtual lines connecting the respective representative points of two of the plurality of segmented regions are parallel or approximately parallel, or perpendicular or approximately perpendicular to the first direction, the layout-rule generation device generates a layout rule that specifies to align the positions in the second direction of layout elements to be arranged in the two segmented regions. With such a structure, when it is determined that virtual lines connecting the respective representative points of two of the plurality of segmented regions are parallel or approximately parallel, or perpendicular or approximately perpendicular to the first direction, the layout-rule generation device generates a layout rule that specifies to align the positions in the second direction of layout elements to be arranged in the two segmented regions.

This can provide an advantage that a layout rule that specifies to align the positions in the second direction of layout elements can be relatively easily generated from an electronic document. The use of the generate layout rule in combination with a layout template for the layout of layout elements also offers the advantage that the layout of the electronic document can be reflected to the layout result in a relatively appropriate manner.

Here the representative point is a point of any one point inside the split region and on the boundary, which seems to be important for layout. For example, for a rectangular or another polygonal split region, the apex, the central point, or the center of gravity of the split region can be the representative point; for a circular or elliptic split region, or another region whose outer periphery is curved, the central point or the center of gravity can be the representative point. The same is applied to other aspects of the invention.

Here, the range of "parallel or approximately parallel" can denote the range of a specified angle with reference to a horizontal line or the range that can be rationally determined to be parallel by a person. This can also apply to the range of "perpendicular or approximately perpendicular." The same is applied to the other aspects of the invention.

In the above layout-rule generation system, when it is determined that the respective representative points of at least three of the plurality of segmented regions are arranged on a straight line or an approximately straight line, the layout-rule generation device can generate a layout rule that specifies to arrange layout elements to be arranged in the at least three segmented regions on a straight line. With such a structure, when it is determined that the respective representative points of at least three of the plurality of segmented regions are arranged on a straight line or an approximately straight line, the layout-rule generation device generates a layout rule that specifies to arrange layout elements to be arranged in the at least three segmented regions on a straight line.

This offers the advantage that a layout rule that specifies to arrange layout elements on a straight line can relatively easily be generated from the electronic document. The use of the generated layout rule in combination with a layout template for the layout of layout elements also offers the advantage that the layout of the electronic document can be reflected to the layout result in a relatively appropriate manner.

Here, the range of "on a straight line or an approximately straight line" denotes the range of a specified distance with reference to the straight line or the range that can be rationally determined to be on the straight line by a person. The same is applied to the other aspects of the invention In the above layout-rule generation system, when it is determined that the distances between the representative point of a selected segmented region selected from the plurality of segmented regions and the respective representative points of at least two of segmented regions other than the selected segmented regions are equal or approximately equal, a layout-rule generation device generates a layout rule that specifies to arrange layout elements to be arranged in the at least two segmented regions at equal distance from the layout element arranged in the selected segmented region. With such a structure, when it is determined that the distances between the representative point of a selected segmented region selected from the plurality of segmented regions and the respective representative points of at least two of segmented regions other than the selected segmented regions are equal or approximately equal, the layout-rule generation device generates a layout rule that specifies to arrange layout elements to be arranged in the corresponding segmented regions at equal distance from the layout element arranged in the selected segmented region.

This offers the advantage that a layout rule that specifies to arrange layout elements at an equal distance from a certain layout element can be generated from an electronic document relatively easily. The use of the generate layout rule in combination with a layout template for the layout of layout elements also offers the advantage that the layout of the electronic document can be reflected to the layout result in a relatively appropriate manner.

In the above layout-rule generation system, when it is determined that the distances between a reference point selected from the layout region and the respective representative points of at least two of the plurality of segmented regions are equal or approximately equal, the layout-rule generation device generates a layout rule that specifies to arrange layout elements to be arranged in the at least two segmented regions at an equal distance from the reference point. With such a structure, when it is determined that the distances between a reference point selected from the layout region and the respective representative points of at least two of the plurality of segmented regions are equal or approximately equal, the layout-rule generation means generates a layout rule that specifies to arrange layout elements to be arranged in the corresponding segmented regions at an equal distance from the reference point.

This can offer the advantage that a layout rule that specifies to arrange a plurality of layout elements at an equal distance from the reference point in the layout region can be generated from an electronic document relatively easily. The use of the generated layout rule in combination with a layout template for the layout of layout elements also offers the advantage that the layout of the electronic document can be reflected to the layout result in a relatively appropriate manner.

Here, the reference point is a point of any one point in the layout region, which seems to be important for layout. For example, the center of the layout region, the respective apexes, central points, or center of gravity of the rectangular regions formed by dividing the layout region equally can be the reference point. The same is applied to the other aspects of the invention.

In the above layout-rule generation system, when it is determined that the angles between virtual lines connecting the representative point of the selected segmented region selected from the plurality of segmented regions and the respective representative points of at least three of segmented regions other than the selected segmented region are equal or approximately equal, a layout-rule generation device generates a layout rule that specifies to arrange layout elements to be arranged in the at least three segmented regions at an equal angle with the layout element arranged in the selected segmented region as the center. With such a structure, when it is determined that the angles between virtual lines connecting the representative point of the selected segmented region selected from the plurality of segmented regions and the respective representative points of at least three of segmented regions other than the selected segmented region are equal or approximately equal, the layout-rule generation device generates a layout rule that specifies to arrange layout elements to be arranged in the corresponding segmented regions at an equal angle with the layout element arranged in the selected segmented region as the center.

This can offer the advantage that a layout rule that specifies to arrange layout elements at an equal angle with a certain layout element as the center can be generated relatively easily from an electronic document. The use of the generated layout rule in combination with a layout template for the layout of layout elements also offers the advantage that the layout of the electronic document can be reflected to the layout result in a relatively appropriate manner.

In the above layout-rule generation system, when it is determined that the angles between virtual lines connecting a reference point selected from the layout region and the respective representative points of at least three of the plurality of segmented regions are equal or approximately equal, the layout-rule generation device generates a layout rule that specifies to arrange layout elements to be arranged in the at least three segmented regions at an equal angle with the reference point as the center. With such a structure, when it is determined that the angles between virtual lines connecting a reference point selected from the layout region and the respective representative points of at least three of the segmented regions are equal or approximately equal, the layout-rule generation device generates a layout rule that specifies to arrange layout elements to be arranged in the corresponding segmented regions at an equal angle with the reference point as the center.

This offers the advantage that a layout rule that specifies to arrange layout elements at an equal angle with the reference point as the center can be generated relatively easily from an electronic document. The use of the generated layout rule in combination with a layout template for the layout of layout elements also offers the advantage that the layout of the electronic document can be reflected to the layout result in a relatively appropriate manner.

An exemplary layout system of Invention 8 is provided which lays out layout elements in accordance with a layout template that specifies the layout of a predetermined layout region. The system can include a template generation device for generating the layout template on the basis of an electronic document in which the layout region is segmented into a plurality of segmented regions, a layout-rule generation device for generating a layout rule on the basis of the positional relationship between at least two of the plurality of segmented regions, a layout-element storage device for storing a plurality of the layout elements, a layout-element selection device for selecting the layout elements from the layout-element storage means, and a layout device for laying out the layout elements selected by the layout-element selection means.

The layout device arranges the layout elements in the layout region according to the layout rule generated by the layout-rule generation device and the layout template generated by the template generation device for the same electronic document.

With such a structure, a layout rule is generated by the layout-rule generation device on the basis of the positional relationship between at least two of the plurality of segmented regions, a layout template is generated by the template generation device on the basis of an electronic document, layout elements are selected from the layout-element storage device by the layout-element selection device; and the selected layout elements are arranged in the layout region by the layout device according to the layout rule and layout template generated for the same electronic document.

This can offer the advantage of generating a layout rule applied to an electronic document relatively easily. This also offers the advantage of reflecting the layout of the electronic document to the result of layout by the layout means in a relatively appropriate manner. Here, the "layout" denotes a display layout when the layout is performed for the purpose of screen display and a print display for the purpose of a layout to be printed on paper. The same is applied to the other aspects of the invention.

The layout-element storage means stores layout elements by every possible means and at every possible time, which may store layout elements in advance or by external input during the operation of the system. The same is applied to the other aspects of the invention.

The system may be achieved as a single unit, a terminal, or another unit, or alternatively, as a network system connecting to multiple units, terminals, and other units such that they can communicate with one another. In the latter case, the components may belong to any of the units that can communicate therewith. The same is applied to the other aspects of the invention.

A layout system can be a system for laying out layout elements in accordance with a layout template that specifies the layout of a predetermined layout region. The system can include a template generation device for generating the layout template on the basis of an electronic document in which the layout region is segmented into a plurality of segmented regions, a layout-rule generation device for generating a layout rule on the basis of the positional relationship between at least two of the plurality of segmented regions, a layout-element presentation device for presenting the layout elements in the layout-element storage device for selection of any of them, a layout-element selection device for inputting the selection of the layout elements, and layout device for laying out the layout elements selected by the layout-element selection device. The layout device arranges the layout elements in the layout region according to the layout rule generated by the layout-rule generation device and the layout template generated by the template generation device for the same electronic document.

With such a structure, a layout rule is generated by the layout-rule generation device on the basis of the positional relationship between at least two of the plurality of segmented regions and a layout template is generated by the template generation device on the basis of an electronic document. The layout elements in the layout-element storage device are presented by the layout-element presentation device for selection any of them. When the user selects layout elements by the layout-element selection device, the selected layout elements are arranged in the layout region by the layout device according to the layout rule generated by the layout-rule generation device and the layout template generated by the template generation device.

This structure offers the same advantages as those of the above layout system.

The layout system according to the above invention can further include an output device for outputting the result of layout by the layout means. With such a structure, the result of layout by the layout means is outputted by the output device.

The output device may have any structures that output the result of layout by the layout device. This includes, for example, print means for printing the result of layout, display device for displaying the layout result, and sound output device for outputting the layout result by a sound. The display means falls under, for example, a projector and a liquid crystal display (LCD).

In the layout system according to the above invention, the layout region can have two sides parallel to a first direction and two sides parallel to a second direction perpendicular to the first direction as outer periphery. When it is determined that virtual lines connecting the respective representative points of two of the plurality of segmented regions are parallel or approximately parallel, or perpendicular or approximately perpendicular to the first direction, the layout-rule generation means generates a layout rule that specifies to align the positions in the second direction of layout elements to be arranged in the two segmented regions. This structure offers the same operation and advantages as those of the above layout-rule generation system.

In the layout system according to the above, when it is determined that the respective representative points of at least three of the plurality of segmented regions are arranged on a straight line or an approximately straight line, the layout-rule generation device generates a layout rule that specifies to arrange layout elements to be arranged in the at least three segmented regions on a straight line. This structure offers the same operation and advantages as those of the above layout-rule generation system.

In the layout system according to the above, when it is determined that the distances between the representative point of a selected segmented region selected from the plurality of segmented regions and the respective representative points of at least two of segmented regions other than the selected segmented regions are equal or approximately equal, the layout-rule generation device generates a layout rule that specifies to arrange layout elements to be arranged in the at least two segmented regions at an equal distance from the layout element arranged in the selected segmented region. This structure offers the same operation and advantages as those of the above layout-rule generation system.

In the layout system according to the above, when it is determined that the distances between a reference point selected from the layout region and the respective representative points of at least two of the plurality of segmented regions are equal or approximately equal, the layout-rule generation device generates a layout rule that specifies to arrange layout elements to be arranged in the at least two segmented regions at an equal distance from the reference point. This structure offers the same operation and advantages as those of the layout-rule generation system of Invention 5.

In the layout system according to the above, when it is determined that the angles between virtual lines connecting the representative point of the selected segmented region selected from the plurality of segmented regions and the respective representative points of at least three of segmented regions other than the selected segmented region are equal or approximately equal, the layout-rule generation device generates a layout rule that specifies to arrange layout elements to be arranged in the at least three segmented regions at an equal angle with the layout element arranged in the selected segmented region as the center. This structure offers the same operation and advantages at those of the above layout-rule generation system.

In the layout system according to the above, when it is determined that the angles between virtual lines connecting a reference point selected from the layout region and the respective representative points of at least three of the plurality of segmented regions are equal or approximately equal, the layout-rule generation device generates a layout rule that specifies to arrange layout elements to be arranged in the at least three segmented regions at an equal angle with the reference point as the center. This structure offers the same operation and advantages as those of the above layout-rule generation system.

In order to achieve the above object, a layout-rule generation program can be provided which generates a layout rule on the basis of an electronic document in which a predetermined layout region is segmented into a plurality of segmented regions. The program can include a program for a computer to execute a process including a layout-rule generation step for generating the layout rule on the basis of the positional relationship between at least two of the plurality of segmented regions. With such a structure, the program is read by a computer. When the computer executes the process according to the read program, the same operation and advantages as those of the layout-rule generation system of the above can be provided.

In the layout-rule generation program according to the above, the layout region can have two sides parallel to a first direction and two sides parallel to a second direction perpendicular to the first direction as outer periphery. When it is determined that virtual lines connecting the respective representative points of two of the plurality of segmented regions are parallel or approximately parallel, or perpendicular or approximately perpendicular to the first direction, a layout rule is generated, in the layout-rule generation step, that specifies to align the positions in the second direction of layout elements to be arranged in the two segmented regions. With such a structure, the program is read by a computer. When the computer executes the process according to the read program, the same operation and advantages as those of the above layout-rule generation system can be provided.

In the layout-rule generation program described above, when it is determined that the respective representative points of at least three of the plurality of segmented regions are arranged on a straight line or an approximately straight line, a layout rule is generated, in the layout-rule generation step, that specifies to arrange layout elements to be arranged in the at least three segmented regions on a straight line. With such a structure, the program is read by a computer. When the computer executes the process according to the read program, the same operation and advantages as those of the layout-rule generation system.

In the layout-rule generation program according to the above, when it is determined that the distances between the representative point of a selected segmented region selected from the plurality of segmented regions and the respective representative points of at least two of segmented regions other than the selected segmented regions are equal or approximately equal, a layout rule is generated, in the layout-rule generation step, that specifies to arrange layout elements to be arranged in the at least two segmented regions at equal distance from the layout element arranged in the selected segmented region. With such a structure, the program is read by a computer. When the computer executes the process according to the read program, the same operation and advantages as those of the above layout-rule generation system can be provided.

In the layout-rule generation program according to the above, when it is determined that the distances between a reference point selected from the layout region and the respective representative points of at least two of the plurality of segmented regions are equal or approximately equal, a layout rule is generated, in the layout-rule generation step, that specifies to arrange layout elements to be arranged in the at least two segmented regions at an equal distance from the reference point. With such a structure, the program is read by a computer. When the computer executes the process according to the read program, the same operation and advantages as those of the above layout-rule generation system can be provided.

In the layout-rule generation program according to the above, when it is determined that the angles between virtual lines connecting the representative point of the selected segmented region selected from the plurality of segmented regions and the respective representative points of at least three of segmented regions other than the selected segmented region are equal or approximately equal, a layout rule is generated, in the layout-rule generation step, that specifies to arrange layout elements to be arranged in the at least three segmented regions at an equal angle with the layout element arranged in the selected segmented region as the center. With such a structure, the program is read by a computer. When the computer executes the process according to the read program, the same operation and advantages as those of the above layout-rule generation system can be provided.

In the layout-rule generation program according to the above, when it is determined that the angles between virtual lines connecting a reference point selected from the layout region and the respective representative points of at least three of the plurality of segmented regions are equal or approximately equal, a layout rule is generated, in the layout-rule generation step, that specifies to arrange layout elements to be arranged in the at least three segmented regions at an equal angle with the reference point as the center. With such a structure, the program is read by a computer. When the computer executes the process according to the read program, the same operation and advantages as those of the above layout-rule generation system can be provided.

In order to achieve the above object, a layout program can be provided for a computer to execute a process of laying out layout elements according to a layout template that specifies the layout of a predetermined layout region. The program can include a program for the computer to execute the process of: a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element selection step of selecting the layout elements from the layout-element storage device for storing a plurality of the layout elements; and a layout step of laying out the layout elements selected in the layout-element selection step. In the layout step, the layout elements are arranged in the layout region according to the layout rule generated in the layout-rule generation step and the layout template generated in the template generation step for the same electronic document.

With such a structure, the program is read by a computer. When the computer executes the process according to the read program, the same operation and advantages as those of the above layout-rule generation system can be provided.

A layout program of Invention 25 is a program for a computer to execute a process of laying out layout elements according to a layout template that specifies the layout of a predetermined layout region. The program comprises a program for the computer to execute the process of: a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element presentation step of presenting the layout elements in the layout-element storage means that stores a plurality of the layout elements for promoting selection of any of them; a layout-element selection step of inputting the selection of the layout elements; and a layout step of laying out the layout elements selected in the layout-element selection step.

In the layout step, the layout elements are arranged in the layout region according to the layout rule generated in the layout-rule generation step and the layout template generated in the template generation step for the same electronic document.

With such a structure, the program is read by a computer. When the computer executes the process according to the read program, the same operation and advantages as those of the layout-rule generation system of Invention 9 can be provided.

The program according to the above invention can further include a program for the computer to execute an output step of outputting the result of layout in the layout step.

With such a structure, the program is read by a computer. When the computer executes the process according to the read program, the same operation and advantages as those of the above layout-rule generation system can be provided.

The output step may take any forms in which the result of layout is output by the layout step. This includes, for example, a print step for printing the result of layout, a display step of displaying the layout result, and a sound output step of outputting the layout result by a sound. The display step falls under, for example, displays by a projector and a liquid crystal display (LCD). The same applies to the above storage medium and layout method.

In order to achieve the above object, a storage medium of is provided, which is a computer readable storage medium that stores a layout-rule generation program for generating a layout rule on the basis of an electronic document in which a predetermined layout region is segmented into a plurality of segmented regions. The storage medium stores a program for a computer to execute a process including a layout-rule generation step of generating the layout rule on the basis of the positional relationship between at least two of the plurality of segmented regions. With such a structure, the program is read from the recording medium by a computer. When the computer executes the process according to the read program, the same operation and advantages as those of the above layout-rule generation system can be provided.

In the above storage medium, the layout region can have two sides parallel to a first direction and two side parallel to a second direction perpendicular to the first direction for outer periphery, and when it is determined that virtual lines connecting the respective representative points of two of the plurality of segmented regions are parallel or approximately parallel, or perpendicular or approximately perpendicular to the first direction, a layout rule is generated in the layout-rule generation step, that specifies to align the positions in the second direction of layout elements to be arranged in the two segmented regions. With such a structure, the program is read from the recording medium by a computer. When the computer executes the process according to the read program, the same operation and advantages as those of the above layout-rule generation system can be provided.

In the storage medium according to the above, when it is determined that the respective representative points of at least three of the plurality of segmented regions are arranged on a straight line or an approximately straight line, a layout rule is generated, in the layout-rule generation step, that specifies to arrange layout elements to be arranged in the at least three segmented regions on a straight line. With such a structure, the program is read from the recording medium by a computer. When the computer executes the process according to the read program, the same operation and advantages as those of the above layout-rule generation system can be provided.

In the storage medium according to the above, when it is determined that the distances between the representative point of a selected segmented region selected from the plurality of segmented regions and the respective representative points of at least two of segmented regions other than the selected segmented regions are equal or approximately equal, a layout rule is generated, in the layout-rule generation step, that specifies to arrange layout elements to be arranged in the at least two segmented regions at equal distance from the layout element arranged in the selected segmented region. With such a structure, the program is read from the recording medium by a computer. When the computer executes the process according to the read program, the same operation and advantages as those of the above layout-rule generation system can be provided.

In the storage medium according to the above, when it is determined that the distances between a reference point selected from the layout region and the respective representative points of at least two of the plurality of segmented regions are equal or approximately equal, a layout rule is generated, in the layout-rule generation step, that specifies to arrange layout elements to be arranged in the at least two segmented regions at an equal distance from the reference point. With such a structure, the program is read from the recording medium by a computer. When the computer executes the process according to the read program, the same operation and advantages as those of the layout-rule generation system of Invention 5 can be provided.

In the storage medium according the above, when it is determined that the angles between virtual lines connecting the representative point of the selected segmented region selected from the plurality of segmented regions and the respective representative points of at least three of segmented regions other than the selected segmented region are equal or approximately equal, a layout rule is generated, in the layout-rule generation step, that specifies to arrange layout elements to be arranged in the at least three segmented regions at an equal angle with the layout element arranged in the selected segmented region being as the center. With such a structure, the program is read from the recording medium by a computer. When the computer executes the process according to the read program, the same operation and advantages as those of the above layout-rule generation system of can be provided.

In the storage medium according to the above, when it is determined that the angles between virtual lines connecting a reference point selected from the layout region and the respective representative points of at least three of the plurality of segmented regions are equal or approximately equal, a layout rule is generated, in the layout-rule generation step, that specifies to arrange layout elements to be arranged in the at least three segmented regions at an equal angle with the reference point as the center. With such a structure, the program is read from the recording medium by a computer. When the computer executes the process according to the read program, the same operation and advantages as those of the above layout-rule generation system can be provided.

A storage medium can be a computer readable storage medium that stores a layout program for a computer to execute a process of laying out layout elements according to a layout template that specifies the layout of a predetermined layout region. The storage medium stores a program for the computer to execute the process of: a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element selection means for selecting the layout elements from the layout-element storage means that stores a plurality of the layout elements; and a layout step of laying out the layout elements selected in the layout-element selection step.

In the layout step, the layout elements are arranged in the layout region according to the layout rule generated in the layout-rule generation step and the layout template generated in the template generation step for the same electronic document. With such a structure, the program is read from the recording medium by a computer. When the computer executes the process according to the read program, the same operation and advantages as those of the above layout-rule generation system can be provided.

A storage medium can be a computer readable storage medium that stores a layout program for a computer to execute a process of laying out layout elements according to a layout template that specifies the layout of a predetermined layout region. The storage medium stores a program for the computer to execute the process of: a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element presentation step of presenting the layout elements in the layout-element storage means that stores a plurality of the layout elements for promoting selection of any of them; a layout-element selection step of selecting the layout elements; and a layout step of laying out the layout elements selected in the layout-element selection step.

In the layout step, the layout elements are arranged in the layout region according to the layout rule generated in the layout-rule generation step and the layout template generated in the template generation step for the same electronic document. With such a structure, the program is read from the recording medium by a computer. When the computer executes the process according to the read program, the same operation and advantages as those of the above layout-rule generation system can be provided.

The storage medium according to the above stores a program for the computer to execute an output step of outputting the result of layout in the layout step. With such a structure, the program is read from the recording medium by a computer. When the computer executes the process according to the read program, the same operation and advantages as those of the above layout-rule generation system can be provided.

In order to achieve the above object, a layout-rule generation method can be provided which generates a layout rule on the basis of an electronic document in which a predetermined layout region is segmented into a plurality of segmented regions. The method can include a layout-rule generation step of generating the layout rule on the basis of the positional relationship between at least two of the plurality of segmented regions. This offers the same advantages as those of the above layout-rule generation system.

A layout-rule generation method of the above can be provided which generates a layout rule on the basis of an electronic document in which a predetermined layout region is segmented into a plurality of segmented regions. The method can include a layout-rule generation step in which operation means generates the layout rule on the basis of the positional relationship between at least two of the plurality of segmented regions. This offers the same advantages as those of the above layout-rule generation system.

In the layout-rule generation method according to, the layout region has two sides parallel to a first direction and two sides parallel to a second direction perpendicular to the first direction for outer periphery. When it is determined that virtual lines connecting the respective representative points of two of the plurality of segmented regions are parallel or approximately parallel, or perpendicular or approximately perpendicular to the first direction, a layout rule is generated, in the layout-rule generation step, that specifies to align the positions in the second direction of layout elements to be arranged in the two segmented regions. This offers the same advantages as those of the exemplary layout-rule generation system.

In the layout-rule generation method according to the above, when it is determined that the respective representative points of at least three of the plurality of segmented regions are arranged on a straight line or an approximately straight line, a layout rule is generated, in the layout-rule generation step, that specifies to arrange layout elements to be arranged in the at least three segmented regions on a straight line. This offers the same advantages as those of the above layout-rule generation system.

In the layout-rule generation method according to the above, when it is determined that the distances between the representative point of a selected segmented region selected from the plurality of segmented regions and the respective representative points of at least two of segmented regions other than the selected segmented regions are equal or approximately equal, a layout rule is generated, in the layout-rule generation step, that specifies to arrange layout elements to be arranged in the at least two segmented regions at equal distance from the layout element arranged in the selected segmented region. This offers the same advantages as those of the above layout-rule generation system.

In the layout-rule generation method according to the above, when it is determined that the distances between a reference point selected from the layout region and the respective representative points of at least two of the plurality of segmented regions are equal or approximately equal, a layout rule is generated, in the layout-rule generation step, that specifies to arrange layout elements to be arranged in the at least two segmented regions at an equal distance from the reference point. This offers the same advantages as those of the above layout-rule generation system.

In the layout-rule generation method according to the above, when it is determined that the angles between virtual lines connecting the representative point of the selected segmented region selected from the plurality of segmented regions and the respective representative points of at least three of segmented regions other than the selected segmented region are equal or approximately equal, a layout rule is generated, in the layout-rule generation step, that specifies to arrange layout elements to be arranged in the at least three segmented regions at an equal angle with the layout element arranged in the selected segmented region being as the center. This offers the same advantages as those of the above layout-rule generation system.

In the layout-rule generation method according to the above, when it is determined that the angles between virtual lines connecting a reference point selected from the layout region and the respective representative points of at least three of the plurality of segmented regions are equal or approximately equal, a layout rule is generated, in the layout-rule generation step, that specifies to arrange layout elements to be arranged in the at least three segmented regions at an equal angle with the reference point being as the center. This offers the same advantages as those of the above layout-rule generation system.

In order to achieve the above object, a layout method of Invention 45 is provided which lays out layout elements according to a layout template that specifies the layout of a predetermined layout region.

The method can include a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element selection step of selecting the layout elements from the layout-element storage means that stores a plurality of the layout elements; and a layout step of laying out the layout elements selected in the layout-element selection step.

In the layout step, the layout elements are arranged in the layout region according to the layout rule generated in the layout-rule generation step and the layout template generated in the template generation step for the same electronic document.

This offers the same advantages as those of the layout system of Invention 8.

A layout method can be a method of laying out layout elements according to a layout template that specifies the layout of a predetermined layout region. The method can include: a template generation step in which operation means generates the layout template on the basis of an electronic document in which the layout region is segmented into a plurality of segmented regions; a layout-rule generation step in which the operation means generates a layout rule on the basis of the positional relationship between at least two of the plurality of segmented regions; a layout-element selection step in which the operation means selects the layout elements from the layout-element storage means that stores a plurality of the layout elements; and a layout step in which the operation means lays out the layout elements selected in the layout-element selection step.

In the layout step, the layout elements can be arranged in the layout region according to the layout rule generated in the layout-rule generation step and the layout template generated in the template generation step for the same electronic document. This offers the same advantages as those of the above layout system.

A layout method can be a method of laying out layout elements according to a layout template that specifies the layout of a predetermined layout region. The method can include: a template generation step of generating the layout template on the basis of an electronic document in which the layout region is segmented into a plurality of segmented regions; a layout-rule generation step of generating a layout rule on the basis of the positional relationship between at least two of the plurality of segmented regions; a layout-element presentation step of presenting the layout elements in the layout-element storage device that stores a plurality of the layout elements for selection of any of them; a layout-element selection step of inputting the selection of the layout elements; and a layout step of laying out the layout elements selected in the layout-element selection step.

In the layout step, the layout elements can be arranged in the layout region according to the layout rule generated in the layout-rule generation step and the layout template generated in the template generation step for the same electronic document. This offers the same advantages as those of the above layout system.

A layout method can be a method of laying out layout elements according to a layout template that specifies the layout of a predetermined layout region. The method can include: a template generation step in which operation means generates the layout template on the basis of an electronic document in which the layout region is segmented into a plurality of segmented regions; a layout-rule generation step in which the operation means generates a layout rule on the basis of the positional relationship between at least two of the plurality of segmented regions; a layout-element presentation step in which the operation means presents the layout elements in the layout-element storage device that stores a plurality of the layout elements for selection of any of them; a layout-element selection step in which input means inputs the selection of the layout elements; and a layout step in which the operation means lays out the layout elements selected in the layout-element selection step.

In the layout step, the layout elements are arranged in the layout region according to the layout rule generated in the layout-rule generation step and the layout template generated in the template generation step for the same electronic document. This offers the same advantages as those of the above layout system.

The layout method according to the above can include an output step of outputting the result of layout in the layout step. This offers the same advantages as those of the above layout system.

BRIEF DESCRIPTION OF THE DRAWINGS

The invention will be described with reference to the accompanying drawings, wherein like numerals reference like elements, and wherein:

FIG. 3 is a diagram of an example of a layout specified by a layout template;

FIG. 4 is a diagram of the data structure of a layout-rule registration table 400;

FIG. 12 is a diagram of the data structure of an inter-region analysis registration table;

FIG. 19 is a diagram of the data structure of an inter-region analysis registration table;

FIG. 21 is a diagram of the data structure of an inter-region analysis registration table;

DETAILED DESCRIPTION OF EMBODIMENTS

Exemplary embodiments of the invention will be described hereinbelow with reference to the drawings. FIGS. 1 to 21 show a system for generating a layout rule, a layout system, a program for generating a layout rule, a layout program, a storage medium, a method of generating a layout rule, and a layout method, according to exemplary embodiments of the invention.

Figure 1:
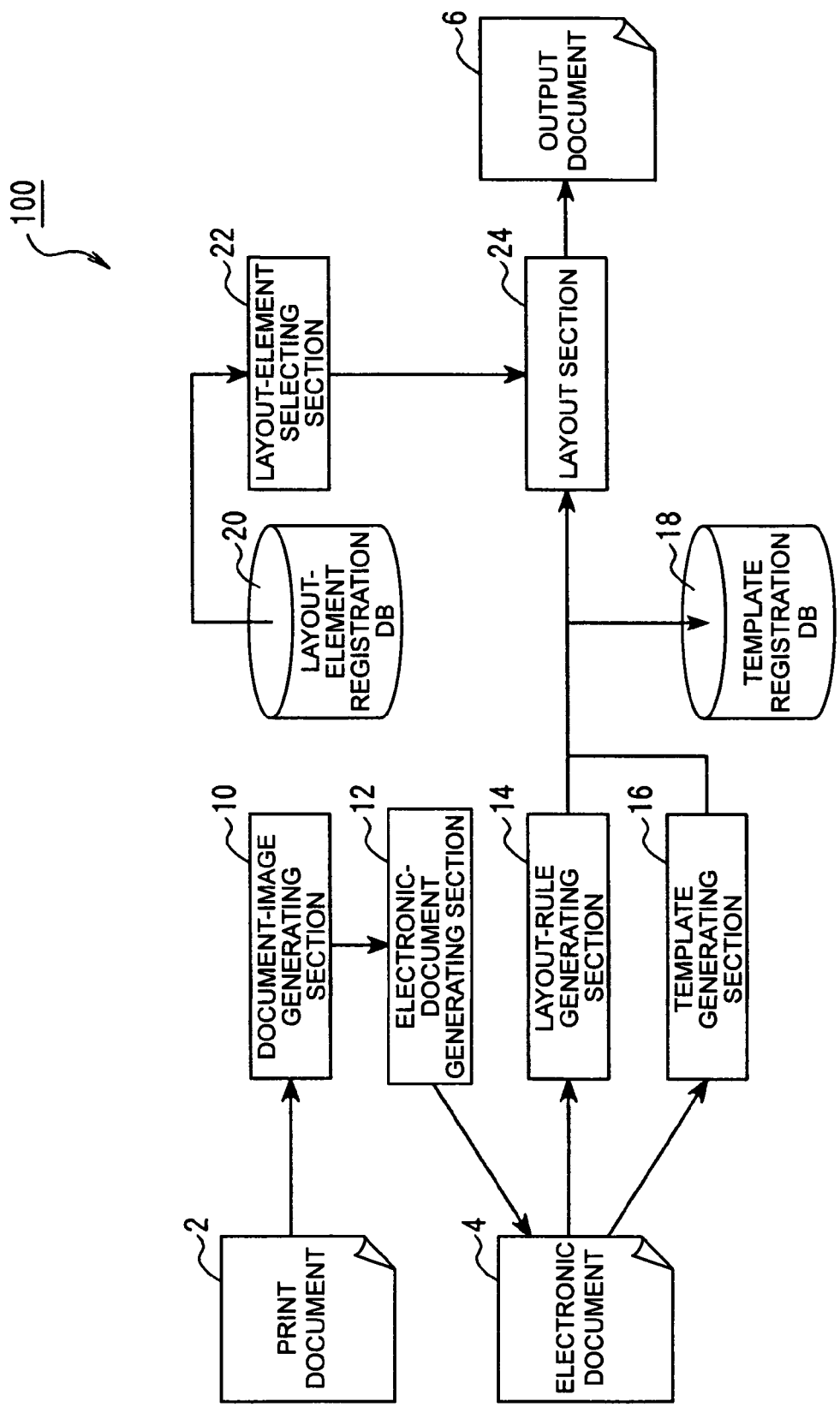
FIG. 1 is a functional block diagram of a functional outline of a layout unit 100.

The embodiments are applications of the system for generating a layout rule, the layout system, the program for generating a layout rule, the layout program, the storage medium, the method of generating a layout rule, and the layout method, according to the invention, for a case in which a layout rule and a layout template are generated from an electronic document 4 and layout elements are laid out in accordance with the layout rule and the layout template, as shown in FIG. 1.

Referring first to FIG. 1, the functional outline of a layout unit 100 according to the invention will be described in detail.

FIG. 1 is a functional block diagram of the functional outline of the layout unit 100. As shown in FIG. 1, the layout unit 100 can include a document-image generating section 10 for optically reading a paper print document 2 such as a catalog to generate a document image and an electronic-document generating section 12 for generating an electronic document 4 based on the document image generated by the document-image generating section 10.

The electronic document 4 is electronic data in which a layout region is split into multiple regions, in each of which elements that can construct a layout (hereinafter, referred to as layout elements) such as character information, photograph information, and figure information are arranged: for example, document data such as a portable document format (PDF).

The layout unit 100 further includes a layout-rule generating section 14 for generating a layout rule based on the electronic document 4 generated by the electronic-document generating section 12, a template generating section 16 for generating a layout template based on the electronic document 4 generated by the electronic-document generating section 12, and a template-registration database (hereinafter, the database is simply abbreviated as a DB) 18. The layout template generated by the template generating section 16 is registered in the template-registration DB 18, in association with the layout rule generated by the layout-rule generating section 14.

The layout unit 100 can further include a layout-element registration DB 20 in which multiple layout elements are registered, a layout-element selecting section 22 for selecting a layout element from the layout-element registration DB 20, and a layout section 24 for laying out the layout element selected by the layout-element selecting section 22.

The layout section 24 lays out the layout elements in accordance with the layout template in the template-registration DB 18 and a layout rule corresponding to it, and outputs the layout result as an output document 6.

Referring now to FIGS. 2 to 9, the structure of the layout unit 100 will be described.

Figure 2:
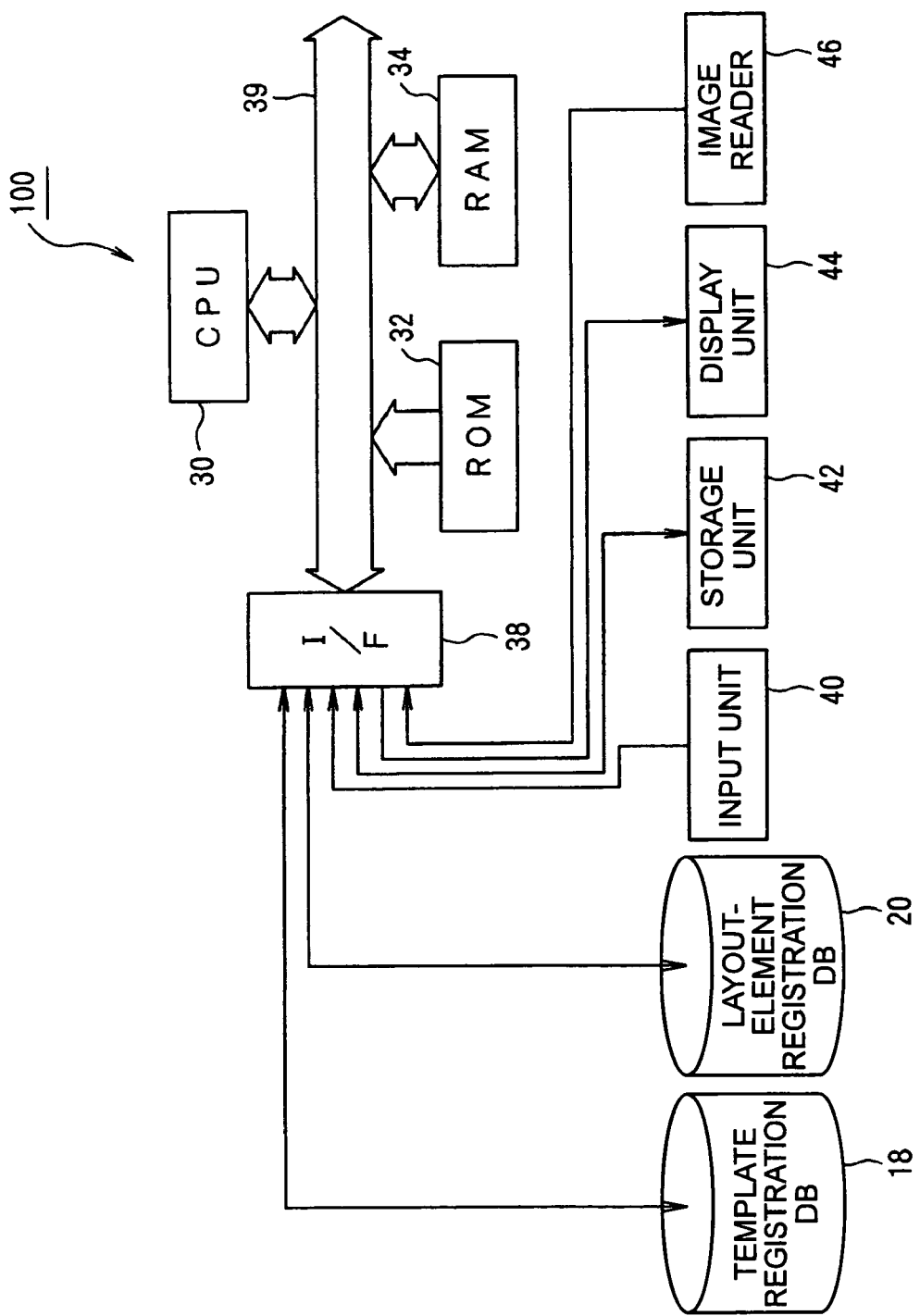
FIG. 2 is a block diagram of the hardware configuration of the layout unit 100.

FIG. 2 is an exemplary block diagram of the hardware configuration of the layout unit 100. As shown in FIG. 2, the layout unit 100 can include a CPU 30 for controlling the calculation and the entire system according to a control program, a ROM 32 storing the control program for the CPU 30 in a specified region, a RAM 34 for storing data read from the ROM 32 etc. and calculations necessary for calculation process of the CPU 30, and an I/F 38 that mediates the input and output of data to external units. They are connected to one another so as to transmit and receive data by a bus 39 serving as a signal line for transferring data.

The I/F 38 connects to the template registration DB 18, the layout-element registration DB 20, an input unit 40 serving as a human interface, such as a keyboard and a mouse, through which data can be inputted, a storage unit 42 for storing data, tables, etc. as files, a display unit 44 displaying a screen according to an image signal, and an image reader 46, such as a scanner, as external units.

Referring then to FIGS. 3 to 6, the data structure of the template registration DB 18 will be described in detail.

The template registration DB 18 holds layout templates generated by the template generating section 16.

In the layout template, the number, size, layout position, and types of information storage frames, the size, type, and color of the font of character information, character spacing and line pitch, the quality, size, aspect ratio, and trimming of photograph information or figure information can be set for each information storage frame, which are described by a markup language such as an extensible markup language (XML).

The information storage frames include a character-information storage frame for storing character information, a photograph-information storage frame for storing photograph information, and a figure-information storage frame for storing figure information, in accordance with the type of the layout elements.

FIG. 3 is a diagram of an example of a layout specified by a layout template.

As shown in FIG. 3 for example, the layout template specifies a layout in which a character-information storage frame 602, a character-information storage frame 604, a photograph-information storage frame 606, a character-information storage frame 608, a character-information storage frame 610, and a figure-information storage frame 612 are laid out in a layout region 600. The character-information storage frames 602 and 604 are arranged in order from the top of the layout region 600. The photograph-information storage frame 606 is arranged on the left under the character-information storage frame 604, while the character-information storage frame 608 is arranged on the right under the character-information storage frame 604, respectively. The character-information storage frame 610 is arranged under the photograph-information storage frame 606, while the figure-information storage frame 612 is arranged under the character-information storage frame 608, respectively. The information storage frames 602 to 612 are in the form of a rectangle.

The layout region 600 may be variable in size or shape, in which case the information storage frames are changed in size and layout position with the change of the layout region 600.

The template registration DB 18 further holds a layout-rule registration table 400 in which layout rules generated by the layout-rule generating section 14 are registered.

FIG. 4 is a diagram of the data structure of the layout-rule registration table 400. The layout-rule registration table 400 holds layout rules in correspondence with a layout template, in which one record is registered for each layout rule, as shown in FIG. 4. Each record includes a field 402 in which an object region for the generation of the layout rule of multiple split regions in the electronic document 4 is registered, a field 404 in which the description of the layout rule is registered, and a field 406 in which the priority in automatic layout is registered. There is no need to register specific positional information such as the coordinates of the object region but has only to register information indicative of positional relationship, such as "arrange A and B in order."

In the example of FIG. 4, a record in the first column contains an object region, "a character region A and a character region B," a layout rule, "arrange the x-coordinates of the centers of the regions," and priority, "5." This shows that a layout rule that specifies to put the x-coordinates of the centers of the character regions A and B in the electronic document 4 in order is generated from the electronic document 4. Accordingly, this indicates that, in performing automatic layout, after layout elements have been stored in a character-information storage frame A corresponding to a character region A and a character-information storage frame B corresponding to a character region B in a layout template, the x-coordinates of the centers of the character regions A and B are arranged in order. Also this indicates that the layout-rule application order is the fifth.

The template registration DB 18 further holds an application-priority registration table 420 in which the priority of application of layout rules is registered for the case where multiple layout rules cannot be applied at the same time.

Figure 5:
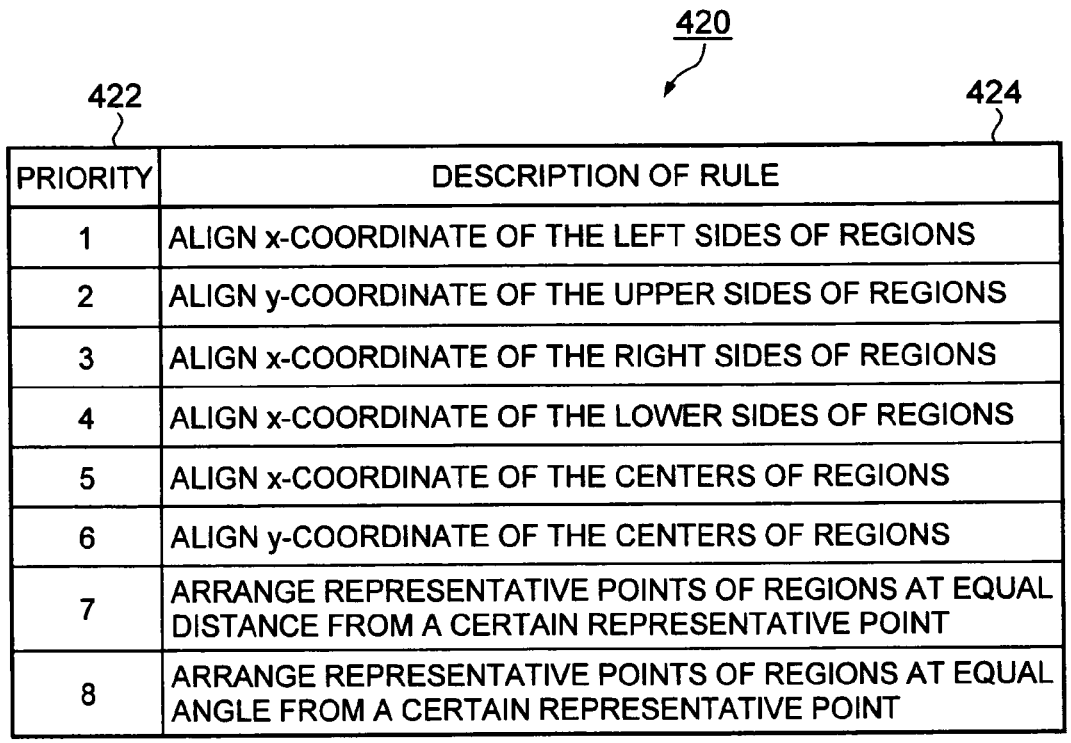
FIG. 5 is a diagram of the data structure of an application-priority registration table 420.

FIG. 5 is a diagram of the data structure of the application-priority registration table 420. As shown in FIG. 5, the application-priority registration table 420 can hold one record for each layout rule. Each record includes a field 422 in which the priority is registered and a field 424 in which the description of the layout rule is registered.

In the example of FIG. 5, a record in the first column contains priority, "1," and a layout rule, "arrange the x-coordinates of the centers of multiple regions in order." This indicates that when multiple layout rules including a layout rule 1 (a layout rule of priority "1," hereinafter, abbreviated in the same way) cannot be applied at the same time, a layout rule of the highest priority (the layout rule 1) of competitive layout rules is applied.

Referring to FIGS. 6 to 9, the structure and process of the CPU 30 will be described.

Figure 6:
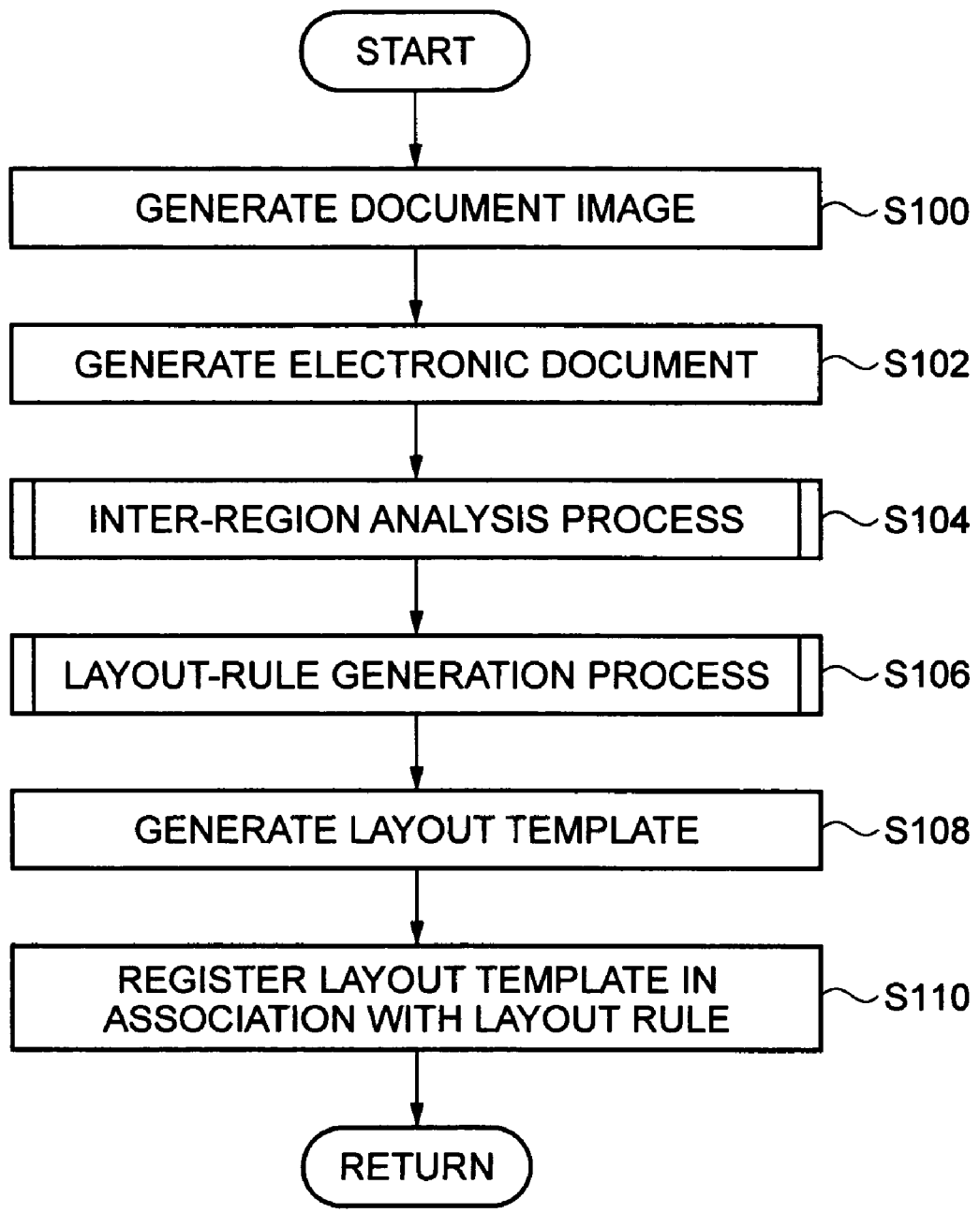
FIG. 6 is a flowchart for a layout process.
Figure 9:
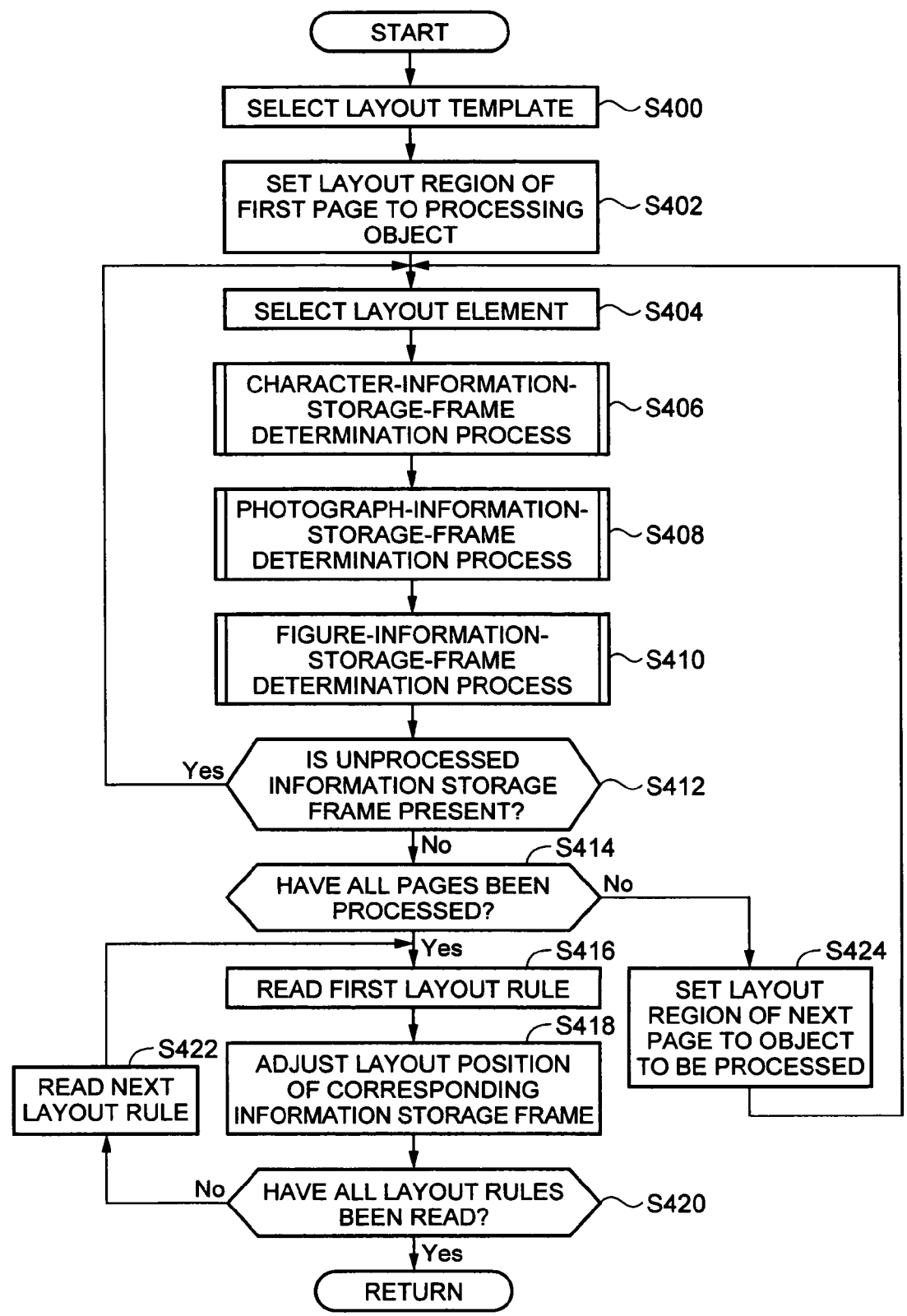
FIG. 9 is a flowchart for an automatic layout process.

The CPU 30 includes a micro processing unit (MPU) etc. and activates a specified grogram stored in a specified region of the ROM 32 and executes an electronic-document analysis process and an automatic layout process shown in the flowcharts of FIGS. 6 and 9 by time sharing.

Referring first to FIG. 6, an electronic-document analysis process will be described in detail. FIG. 6 is a flowchart for an exemplary layout process.

The electronic-document analysis process is executed by the document-image generating section 10, the electronic-document generating section 12, the layout-rule generating section 14, and the template generating section 16. When the analysis process is executed by the CPU 30, the process proceeds to step S100, shown in FIG. 6.

In step S100, the image reader 46 optically reads the print document 2 to generate a document image. The process then moves to step S102, wherein the generated document image is split into regions in which layout elements are arranged to form the electronic document 4 by the invention of JP-A-62-86465, and the like. The process then moves to step S104.

In step S104, an inter-region analysis process of analyzing the positional relationship between the split regions in the electronic document 4 is executed. The process then moves to step S106, wherein a layout rule is generated from the electronic document 4 on the basis of the analysis in step S104. Then the process moves to step S108.

In step S108, an information storage frame is generated which corresponds to the kind, size, layout position of each split region in the electronic document 4; and the generated information storage frames are arranged in the layout region 600 to form a layout template; and the process moves to step S110.

In step S110, the layout rule generated in step S106 is registered in the layout-rule registration table 400 and the layout template generated in step S108 is registered in the template registration DB 18, in association with the layout-rule registration table 400. A series of processes are thus completed and the procedure returns to the first process.

Figure 7:
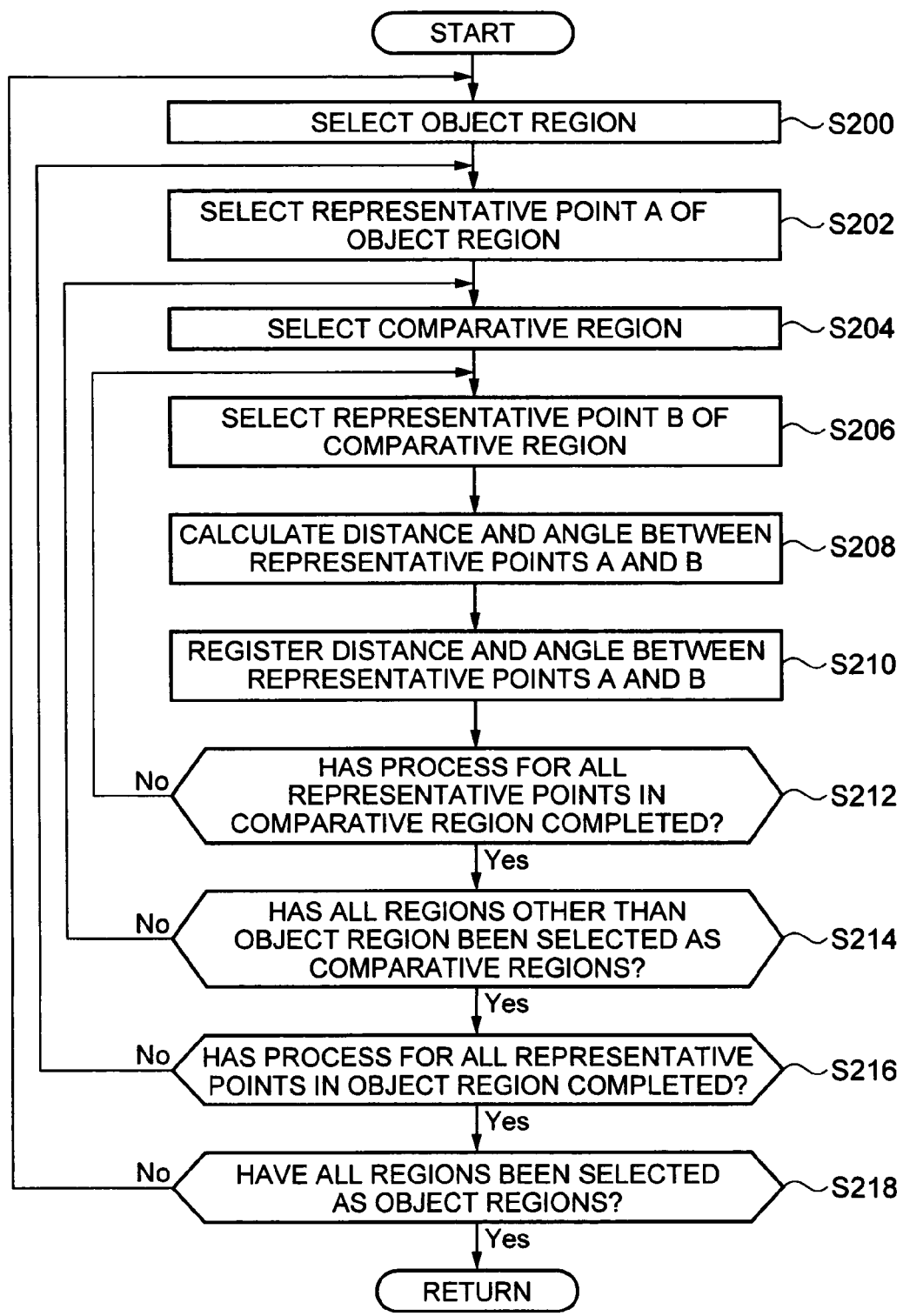
FIG. 7 is a flowchart for an inter-region analysis process.

Referring then to FIG. 7, the inter-region analysis process of step 104 will be described in detail. FIG. 7 is a flowchart for the inter-region analysis process.

When the inter-region analysis process is executed in step S104, the process moves to step S200, shown in FIG. 7.

In step S200, an object region for generating the layout rule is selected from the multiple split regions in the electronic document 4. The process then moves to step S202, wherein one of multiple representative points (e.g., the central point, a left upper point, and a right upper point) in the selected object region (hereinafter, referred to as a selected object region) is selected as a representative point A, and then the process moves to step S204.

In step S204, a comparative region for comparing with the object region is selected from the multiple split regions in the electronic document 4. The process then moves to step S206, wherein one of multiple representative points (e.g., the central point, a left upper point, and a right upper point) in the selected comparative region (hereinafter, referred to as a selected comparative region) is selected as a representative point B, and then the process moves to step S208.

In step S208, the distance and angle between the representative point A and the representative point B are calculated with the horizontal length of the layout region 600 as the x-axis, the vertical length as the y-axis, and the left upper point as the origin, and the process then moves to step S210.

In step S210, the calculated distance and angle are registered in the storage unit 42, wherein the distance and the angle are registered in an inter-region analysis registration table (not shown) of the storage unit 42 in association with the representative point A and the representative point B.

Then the process moves to step S212, wherein it is determined whether or not the processes in steps S206 to S210 have been completed for all the representative points in the selected comparative region. When it is determined that the processes have been completed for all the representative points (Yes), the process moves to step S214.

In step S214, it is determined whether or not all the regions other than the selected object region of the multiple split regions in the electronic document 4 have been selected as comparative regions, wherein when it is determined that all the regions other than the selected object region have been selected as comparative regions (Yes), the process moves to step S216.

In step S216, it is determined whether or not the processes in steps S202 to S214 have been completed for all the representative points in the selected object region. When it is determined that the processes have been completed for all the representative points (Yes), the process moves to step S218.

In step S218, it is determined whether or not all the split regions in the electronic document 4 have been selected as object regions, wherein when it is determined that all the split regions have been selected as object regions (Yes), a series of the processes are completed and the procedure returns to the first process.

On the other hand, when it is determined in step S218 that any of the split regions in the electronic document 4 are not selected as object regions (No), the process moves to step S200.

On the other hand, in step S216, when it is determined that the processes of steps S202 to S214 have not been completed for any of the representative points in the selected object region (No), the process moves to step S202.

On the other hand, when it is determined in step S214 that any of the regions other than the selected object region of the multiple split regions in the electronic document 4 have not been selected as comparative regions (No), the process moves to step S204.

In step S212, when it is determined in step S212 that the processes of steps S206 to S210 have not been completed for any of the representative points of the selected comparative region (No), the process moves to step S206.

Figure 8:
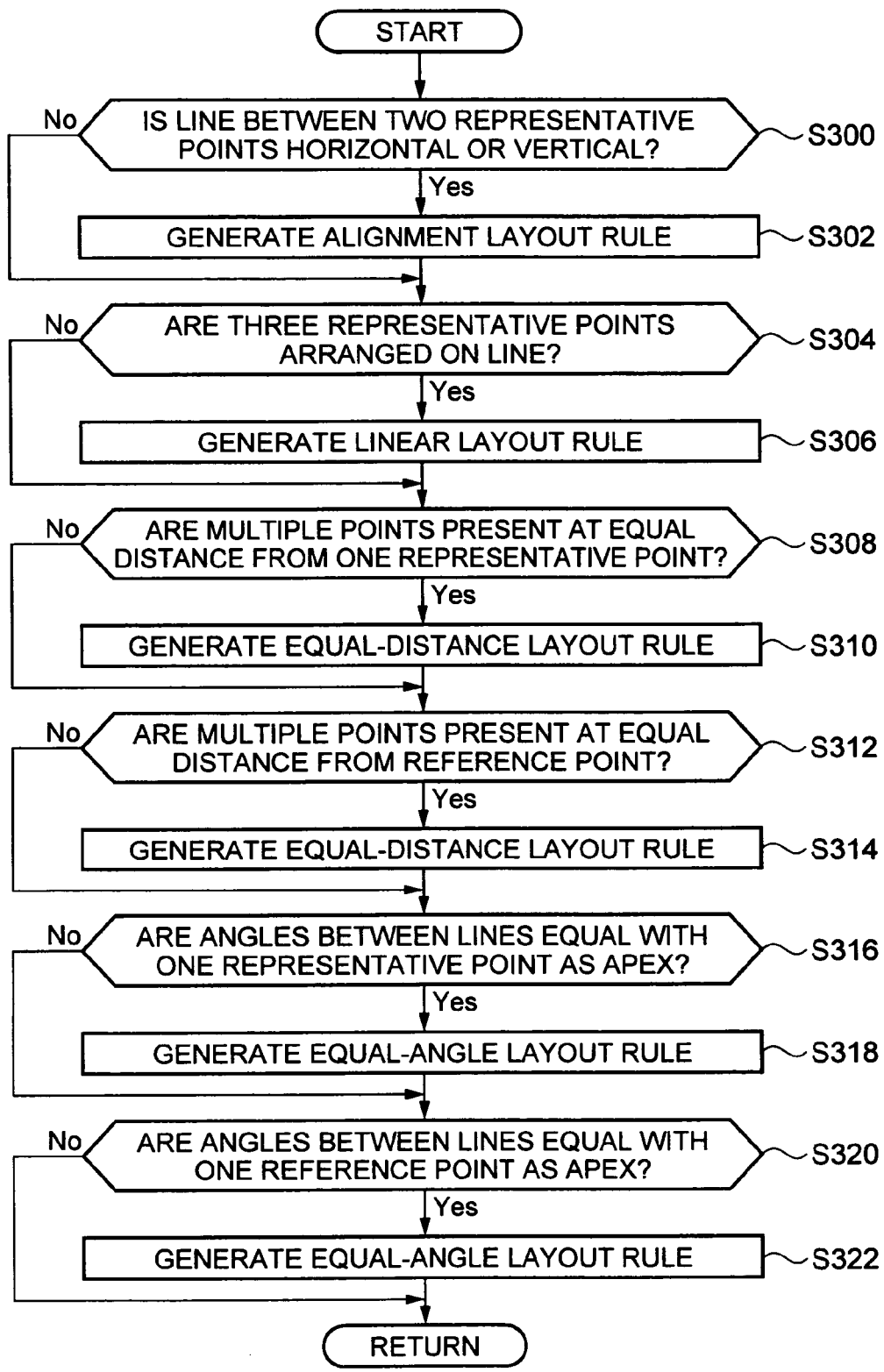
FIG. 8 is a flowchart for a layout-rule generation process.

Referring next to FIG. 8, a layout-rule generation process of step S106 will be described in detail. FIG. 8 is a flowchart for the layout-rule generation process.

When the layout-rule generation process is executed in step S106, the process moves to step S300, shown in FIG. 8.

In step S300, it is determined from the inter-region analysis registration table whether or not a virtual line connecting the representative points of two of the multiple split regions in the electronic document 4 is horizontal or vertical to the layout region 600. When it is determined that the virtual line connecting the representative points of two split regions is horizontal or vertical (Yes), the process moves to step S302, wherein a layout rule is generated that specifies to align the layout positions of the layout elements to be arranged in the corresponding split regions. The process then moves to step S304.

In step S304, it is determined from the inter-region analysis registration table whether or not the representative points of at least three of the multiple split regions in the electronic document 4 are arranged on a straight line (Yes). When it is determined that the representative points of at least three split regions in the electronic document 4 are arranged on a straight line (Yes), the process moves to step S306, wherein a layout rule is generated that specifies to arrange layout elements to be arranged in the corresponding split region on a straight line. The process then moves to step S308.

In step S308, a split region is selected in sequence from the multiple split regions in the electronic document 4 and it is determined from the inter-region analysis registration table whether or not the distances between the representative point in the selected split region and the representative points of at least two of the split regions other than the selected split region are equal. When it is determined that the distances between the representative points are equal (Yes), the process moves to step S310, wherein a layout rule is generated that specifies to arrange layout elements to be arranged in the corresponding split regions at an equal distance from the layout element arranged in the selected split region. The process then moves to step S312.

In step S312, a reference point is selected in sequence from the layout region 600 and it is determined from the inter-region analysis registration table whether or not the distances between the selected reference point and the representative points of at least three of the multiple split regions in the electronic document 4 are equal. When it is determined that the distances between the reference point and the representative points are equal (Yes), the process moves to step S314, wherein a layout rule is generated that specifies to arrange layout elements to be arranged in the corresponding split regions at an equal distance from the reference region. The process then moves to step S316.

In step S316, a split region is selected in sequence from the multiple split regions in the electronic document 4 and it is determined from the inter-region analysis registration table whether or not the angles between virtual lines connecting the representative point of the selected split region and the representative points of at least two of the split regions other than the selected split region are equal. When it is determined that the angles between the virtual lines are equal (Yes), the process moves to step S318, wherein a layout rule is generated that specifies to arrange layout elements to be arranged in the corresponding split regions at an equal angle with the layout element arranged in the selected split region as the center. The process then moves to step S320.

In step S320, a reference point is selected in sequence from the layout region 600 and it is determined from the inter-region analysis registration table whether or not the angles between virtual lines connecting the selected reference point and the representative points of at least three of the multiple split regions in the electronic document 4 are equal. When it is determined that the angles between the virtual lines are equal (Yes), the process moves to step S322, wherein a layout rule is generated that specifies to arrange layout elements to be arranged in the corresponding split regions at an equal angle with the reference point as the center. The series of processes are completed and the procedure returns to the first step.

On the other hand, when it is determined in step S320 that the angles between the virtual lines connecting the reference point selected from the layout region 600 and the representative points of at least three of the multiple split regions in the electronic document 4 are not equal (No), the series of processes are completed and the procedure returns to the first step.

On the other hand, when it is determined in step S316 that the angles between the virtual lines connecting the representative point of the split region selected from multiple split regions in the electronic document 4 and the representative points of at least two of the split regions other than the selected split region are not equal (No), the process moves to step S320.

On the other hand when it is determined in step S312 that the distances between the reference point selected from the layout region 600 and the representative points of at least three of the multiple split regions in the electronic document 4 are not equal (No), the process moves to step S316.

On the other hand, when it is determined in step S308 that the distances between the representative point of the split region selected from the multiple split regions in the electronic document 4 and the representative points of at least two of the split regions other than the selected split region are not equal (No), the process moves to step S312.

On the other hand, when it is determined in step S304 that the representative points of at least three of the multiple split regions in the electronic document 4 are not arranged on a straight line (No), the process moves to step S308.

On the other hand, when it is determined in step S300 that the virtual line connecting the representative points of two of the multiple split regions in the electronic document 4 is not horizontal or vertical to the layout region 600 (No), the process moves to step S304.

Referring next to FIG. 9, an automatic layout process will be described in detail. FIG. 9 is the flowchart for an automatic layout process.

The automatic layout process is executed by the layout-element selecting section 22 and the layout section 24. When the automatic layout process is executed by the CPU 30, the process moves to step S400, shown in FIG. 9.

In step S400, a layout template is selected from the template registration DB 18. The process then moves to step S402, wherein the first page of the layout region 600 of the selected layout template (hereinafter, referred to as a selected layout template) is set as a processing object. The process moves to step S404, wherein a layout element is selected from the layout-element registration DB 20 and then the process moves to step S406.

In step S406, it is determined whether or not the layout element (hereinafter, referred to as a selected layout element) selected in step S404 is character information, wherein when it is determined to be character information, a process of determining the size and layout position of a character-information storage frame depending on the selected layout element is executed. The process then moves to step S408.

In step S408, it is determined whether or not the selected layout element is photograph information, wherein when it is determined to be photograph information, a process of determining the size and layout position of a photograph-information storage frame depending on the selected layout element is executed. The process then moves to step S410.

In step S410, it is determined whether or not the selected layout element is figure information, wherein when it is determined to be figure information, a process of determining the size and layout position of a figure-information storage frame depending on the selected layout element is executed. The process then moves to step S412.

In step S412, it is determined whether or not an unprocessed information storage frame is present in the layout region 600. When it is determined that there is no unprocessed information storage frame (No), the process moves to step S414.

In step S414, it is determined whether or not the processes of steps S404 to S412 have been completed for all the pages of the selected layout template, wherein when it is determined that the processes for all the pages have been completed (Yes), the process moves to step S416.

In step S416, the first layout rule is read from the layout-rule registration table 400 corresponding to the selected layout template and then the process moves to step S418.

In step S418, the layout position of an information storage frame corresponding to the object region for the generation of the layout rule is adjusted in accordance with the read layout rule. At that time, when it is determined that multiple layout rules including the read layout rule cannot be applied at the same time, it is determined whether or not the priority of the read layout rule is the highest of the competitive layout rules based on the application-priority registration table 420. When it is determined that the priority of the read layout rule is the highest, the read layout rule is applied. Conversely, when a negative determination is made, the read layout rule is not applied.

The process then moves to step S420, wherein it is determined whether or not all layout rules have been read from the layout-rule registration table 400 corresponding to the selected layout template. When it is determined that all layout rules have been read (Yes), a series of processes are completed, and the procedure returns to the first step.

On the other hand, it is determined in step S420 that any of the layout rules have not been read from the layout-rule registration table 400 corresponding to the selected layout template (No), the process moves to step S422, wherein the next layout rule is read from the layout-rule registration table 400 corresponding to the selected layout template. The process than moves to step S418.

On the other hand, when it is determined in step S414 that the processes of steps S404 to S412 have not been completed for all the pages of the selected layout template (No), the process moves to step S424, wherein the next page of the layout region 600 in the selected layout template is set as a processing object and the process then moves to step S404.

On the other hand, when it is determined in step S412 that there is an unprocessed information storage frame in the layout region 600 (Yes), the process moves to step S404.

Referring then to FIGS. 10 to 21, the operation of the embodiment will be described.

In using the layout of the print document 2, the user first reads the print document 2 that is the layout capture object with the image reader 46 in the layout unit 100. An example of the layout of the print document 2 is shown in FIG. 10.

Figure 10:
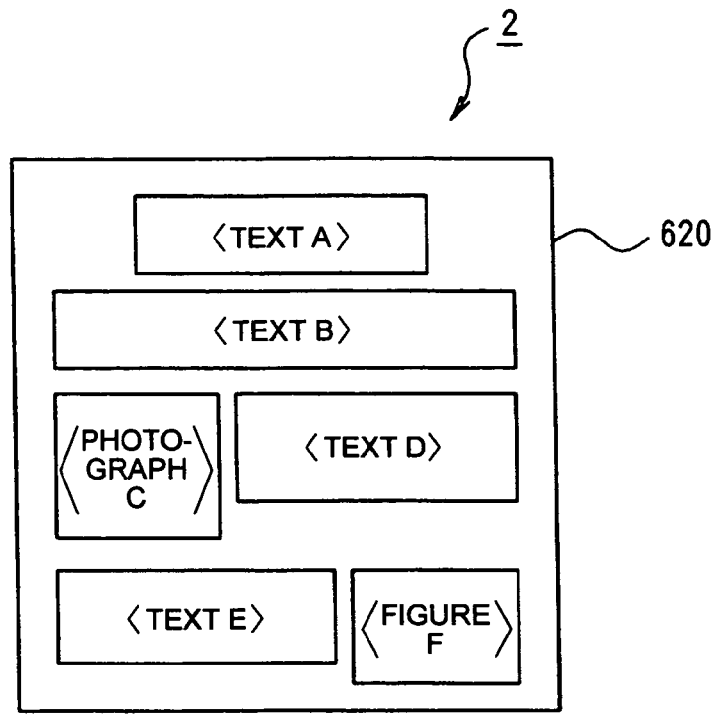
FIG. 10 is a diagram of a layout of a print document 2.

FIG. 10 is an exemplary diagram of the layout of the print document 2. As shown in FIG. 10, the print document 2 contains a text A, a text B, a photograph C, a text D, a text E, and a figure F. The texts A and B are printed on the surface of paper 620 in order from the top. The photograph C is printed on the left under the text B and the text D on the right under the text B, respectively. The text E is printed under the photograph C and the figure F under the text D, respectively.

With the layout unit 100, when the print document 2 is read, a document image is generated and then the electronic document 4 is generated from the generated document image in steps S100 and S102. From the print document 2 in FIG. 10, the electronic document 4 with the layout of FIG. 11 is generated.

Figure 11:
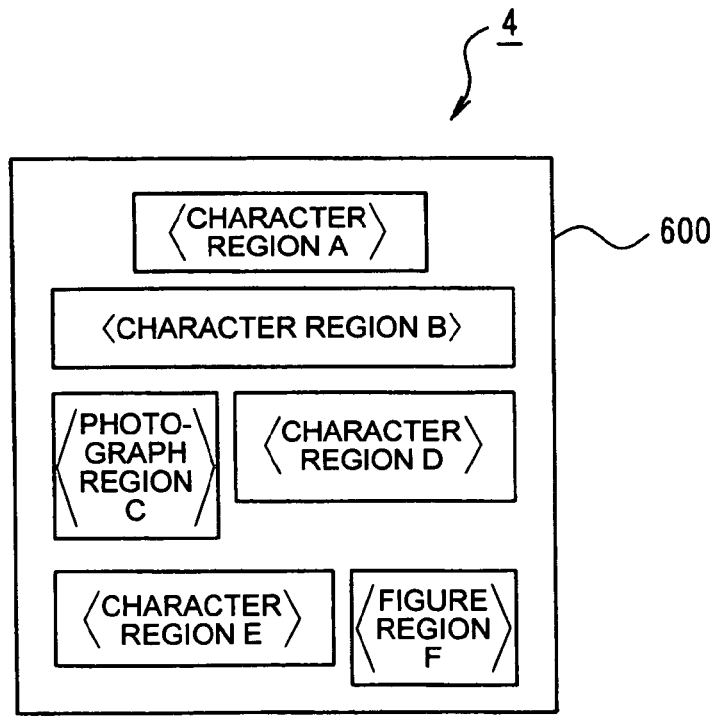
FIG. 11 is a diagram of a layout of an electronic document 4.

FIG. 11 is a diagram of the layout of the electronic document 4. As shown in FIG. 11, a character region A, a character region B, a photograph region C, a character region D, a character region E, and a figure region F are laid out in the layout region 600, as split regions corresponding to the text A, the text B, the photograph C, the text C, the text E, and the figure F. The split regions A to F are all in the form of a rectangle.

In the layout unit 100, when the electronic document 4 is generated, the distances and angles between the split regions A to F in the electronic document 4 are calculated through steps S200 to S218. The split regions A to F each have three representative points, a central point, a left upper point, and a right upper point. Accordingly, the distances and angles between the representative points of each of the split regions A to F and representative points of all the other split regions are calculated.

FIG. 12 is a diagram of the data structure of an inter-region analysis registration table. The distances and angles between the representative points calculated for the electronic document 4 in FIG. 11 are registered in the inter-region analysis registration table, as shown in FIG. 12. In actuality, all the boxes of FIG. 12 except the gray field are filled with the distances and angles. However, only principal boxes are filled with numerals for the purpose of simplification. The value of the angle is as follows: 0 degrees in the horizontal right direction of the layout region 600 and 360 degrees for one counterclockwise round.

In the inter-region analysis registration table of FIG. 12, note the values "0" and "270" in the angle field. This indicates that the representative points are arranged on the horizontal line and the vertical line, respectively. Accordingly, it is determined in step S300 that a virtual line connecting the representative points of two of the multiple split regions in the electronic document 4 is horizontal or vertical to the layout region 600. Thus, in step S302, a layout rule is generated that specifies to align the position of the layout elements to be arranged in their corresponding split regions.

Figure 13:
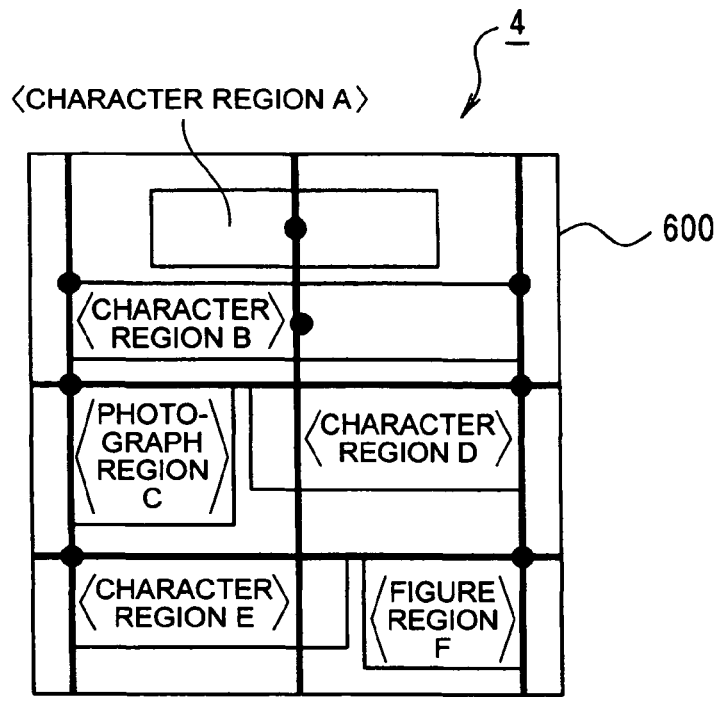
FIG. 13 is a diagram of the layout of the electronic document 4 in which the positional relationship among split regions is analyzed.

FIG. 13 is a diagram of the layout of the electronic document 4 in which the positional relationship among split regions is analyzed. As a first step, as shown in FIG. 13, the virtual line connecting the respective central points of the character region A and the character region B is perpendicular to the layout region 600. Accordingly, a layout rule is generated that specifies to align the x-coordinates of the centers of the layout elements to be arranged in the split regions A and B.

As a second step, the virtual line connecting the respective left upper points of the character region B, the photograph region C, and the character region E are perpendicular to the layout region 600. Accordingly, a layout rule is generated that specifies to align the x-coordinates of the left sides of the layout elements to be arranged in the split regions B, C, and E.

As a third step, the virtual line connecting the respective right upper points of the character region B, the character region D, and the figure region F are perpendicular to the layout region 600. Accordingly, a layout rule is generated that specifies to align the x-coordinates of the right sides of the layout elements to be arranged in the split regions B, D, and F.

As a fourth step, the virtual line connecting the left upper point of the photograph region C and the right upper point of the character region D are horizontal to the layout region 600. Accordingly, a layout rule is generated that specifies to align the y-coordinates of the upper sides of the layout elements to be arranged in the split regions C and D.

As a fifth step, the virtual line connecting the left upper point of the character region E and the right upper point of the figure region F are horizontal to the layout region 600. Accordingly, a layout rule is generated that specifies to align the y-coordinates of the upper sides of the layout elements to be arranged in the split regions E and F.

The five layout rules generated in that way are registered in the layout-rule registration table 400, as shown in FIG. 4.

In the layout unit 100, when the layout rule is generated, a layout template is generated according to the electronic document 4 in step S108. From the electronic document 4 of FIG. 11, a layout template that specifies the layout shown in FIG. 3 is generated.

An automatic layout will be described in which layout elements are laid out according to the layout template thus generated.

In the layout unit 100, layout elements are selected from the layout-element registration DB 20 through the repetition of step S404. Suppose four pieces of character information, one photograph information, and one figure information are selected as layout elements. The character information is stored in the character-information storage frames 602, 604, 608, and 610 and the sizes and layout positions of the character-information storage frames 602, 604, 608, and 610 are determined so as to match the sizes of the character information. The photograph information is stored in the photograph-information storage frame 606 and the size and layout position of the photograph-information storage frame 606 are determined so as to match the size of the photograph information. The figure information is stored in the figure-information storage frame 612 and the size and layout position of the figure-information storage frame 612 are determined so as to match the size of the figure information.

Figure 14:
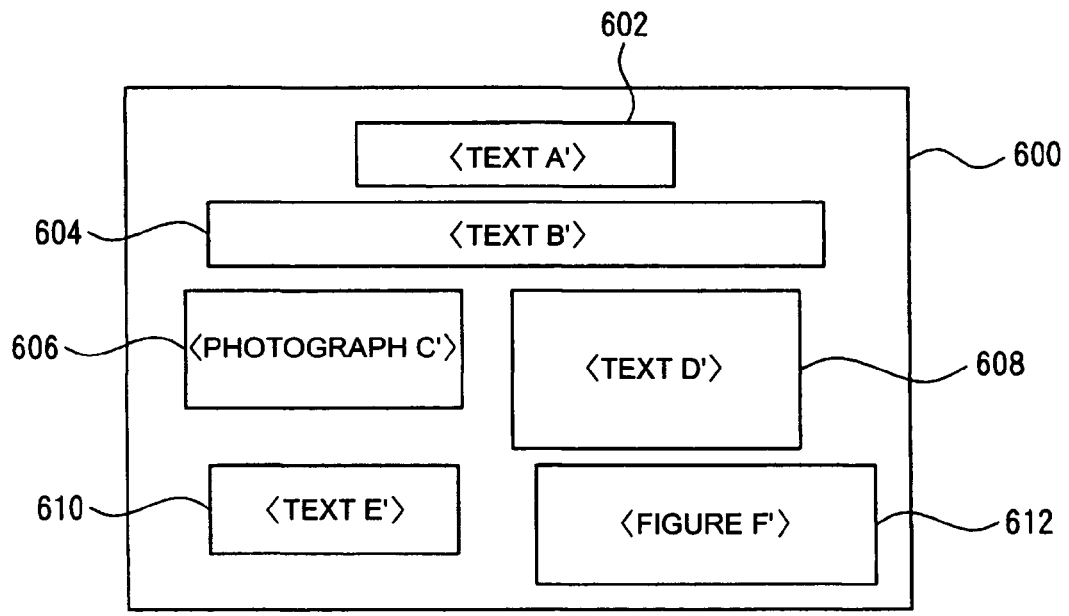
FIG. 14 is a diagram of the result of layout only with a layout template.

FIG. 14 is a diagram of the result of layout only with a layout template. As shown in FIG. 14, when layout is performed only with a layout template, the respective sizes and the layout positions of the information storage frames are changed, which does not reflect the layout of the print document 2 properly. This problem is caused because some layout elements do not always match the initial size of the information storage frames of the layout template. This is caused, for example, when the aspect ratios of photograph information are different, when the sentence of the character information is too short, or when the sentence of the character information is too long.

Thus, the layout positions of the information storage frames corresponding to the object region for generating the layout rule are adjusted according to the layout rule of the layout-rule registration table 400 by repeating the process of step S418.

Figure 15:
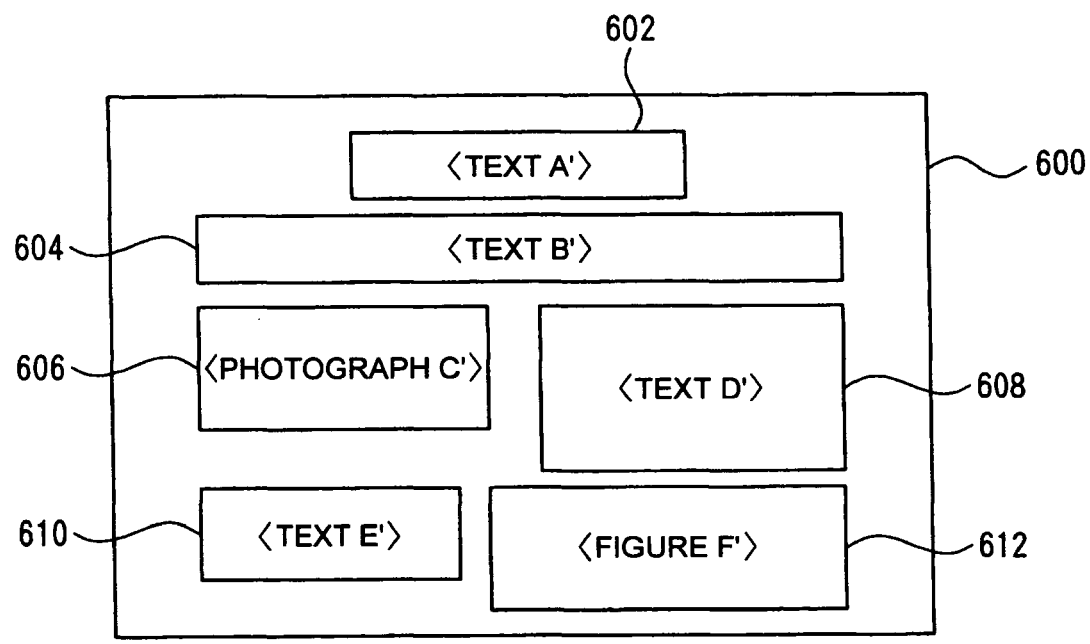
FIG. 15 is a diagram of the result of layout according to a layout rule.

FIG. 15 is a diagram of the result of layout according to a layout rule. As a first step, as shown in FIG. 15, the layout positions of the character-information storage frame 604, the photograph-information storage frame 606, and the character-information storage frame 610 are adjusted according to a layout rule 1 so that the x-coordinates of the left sides thereof are aligned.

As a second step, the layout positions of the photograph-information storage frame 606 and the character-information storage frame 608 are adjusted according to a layout rule 2 so that the y-coordinates of the upper sides thereof are arrange in order, and the layout positions of the character-information storage frame 610 and the figure-information storage frame 612 are adjusted according to a layout rule 2 so that the y-coordinates of the upper sides thereof are aligned.

As a third step, the layout positions of the character-information storage frame 604, the character-information storage frame 608, and the figure-information storage frame 612 are adjusted according to a layout rule 3 so that the x-coordinates of the right sides thereof are aligned.

As a fourth step, the layout positions of the character-information storage frame 602 and the character-information storage frame 604 are adjusted according to a layout rule 5 so that the x-coordinates of the centers thereof are aligned. Thus, as a result of the automatic layout process, the output document 6 with the layout shown in FIG. 15 is generated. The output document 6 reflects the layout of the print document 2 relatively properly, although the contents of the layout elements are entirely different from the print document 2 of FIG. 10.

Figure 16:
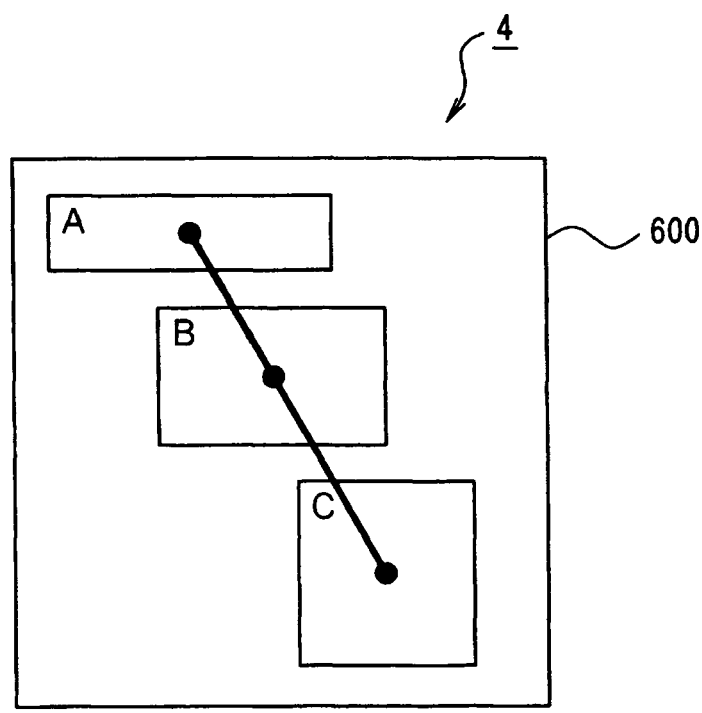
FIG. 16 is a diagram of a layout of the electronic document 4.

Generation of a layout rule from the electronic document 4 with the layout shown in FIG. 16 will next be described. FIG. 16 is a diagram of a layout of the electronic document 4. The electronic document 4 has three split regions A to C arranged in the layout region 600, as shown in FIG. 16. The split regions A to C are arranged at the upper left, the center, and the lower right of the layout region 600, respectively.

In the layout unit 100, the distances and angles between the representative points of the split regions A to C of the electronic document 4 are calculated. The split regions A to C have the central points thereof as representative points. Accordingly, the distance and angle between the representative points of split regions A to C and the representative points of all the other split regions are calculated.

Figures 17, 18:
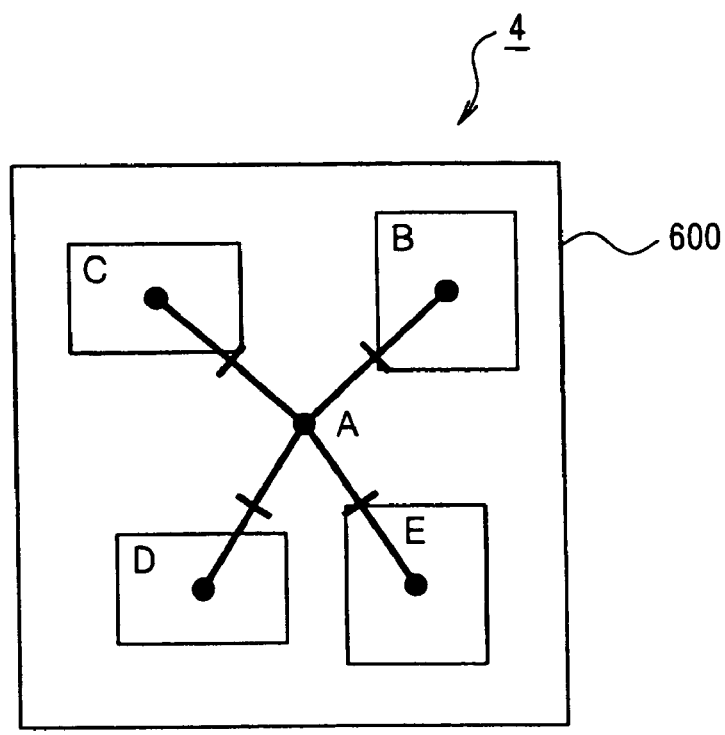
FIG. 17 is a diagram of the data structure of an inter-region analysis registration table.
FIG. 18 is a diagram of a layout of an electronic document 4.

FIG. 17 is a diagram of the data structure of an inter-region analysis registration table. The distances and angles between the representative points calculated for the electronic document 4 of FIG. 16 are registered in an inter-region analysis registration table, as shown in FIG. 17.

In the inter-region analysis registration table of FIG. 17, the angle between the central point of the split region A and the central point of the split region B, and the angle between the central point of the split region A and the central point of the split region C are both "300." This indicates that the three representative points are arranged on a straight line. Accordingly, a determination is made that the representative points of at least three of the multiple split regions in the electronic document 4 are arranged on a straight line in step S304. Thus, a layout rule is generated in step S306 that specifies to arrange the layout elements to be laid out in the split regions A to C on a straight line.

Generation of a layout rule from the electronic document 4 with the layout shown in FIG. 18 will next be described. FIG. 18 is a diagram of a layout of the electronic document 4.

As shown in FIG. 18, the electronic document 4 has four split regions B to E arranged in the layout region 600. The split regions B to E are arranged at the upper right, the upper left, the lower left, and the lower right of the layout region 600, respectively. A reference point A is taken in the vicinity of the center of the layout region 600.

In the layout unit 100, the distances and angles between the reference point A and the representative points of the split regions B to E of the electronic document 4 are calculated. The split regions B to E have the central points thereof as the representative points. Accordingly, the distances and angles between the representative points of split regions B to E and the reference point A can be calculated.

FIG. 19 is a diagram of the data structure of an inter-region analysis registration table. The distances and angles between the representative points calculated for the electronic document 4 of FIG. 18 are registered in an inter-region analysis registration table, as shown in FIG. 19.

In the inter-region analysis registration table of FIG. 19, all the distances between the reference point A and the central point of the split region B, between the reference point A and the central point of the split region C, between the reference point A and the central point of the split region D, and between the reference point A and the central point of the split region E are "10." This indicates that the four representative points are arranged at an equal distance from the reference point A. Accordingly, a determination is made in step S312 that the distance between a reference point selected from the layout region 600 and the representative points of at least three of the multiple split regions in the electronic document 4 are equal. Thus, a layout rule is generated in step S314 that specifies to arrange the layout elements to be laid out in the split regions B to E at an equal distance from the reference point A.

Figure 20:
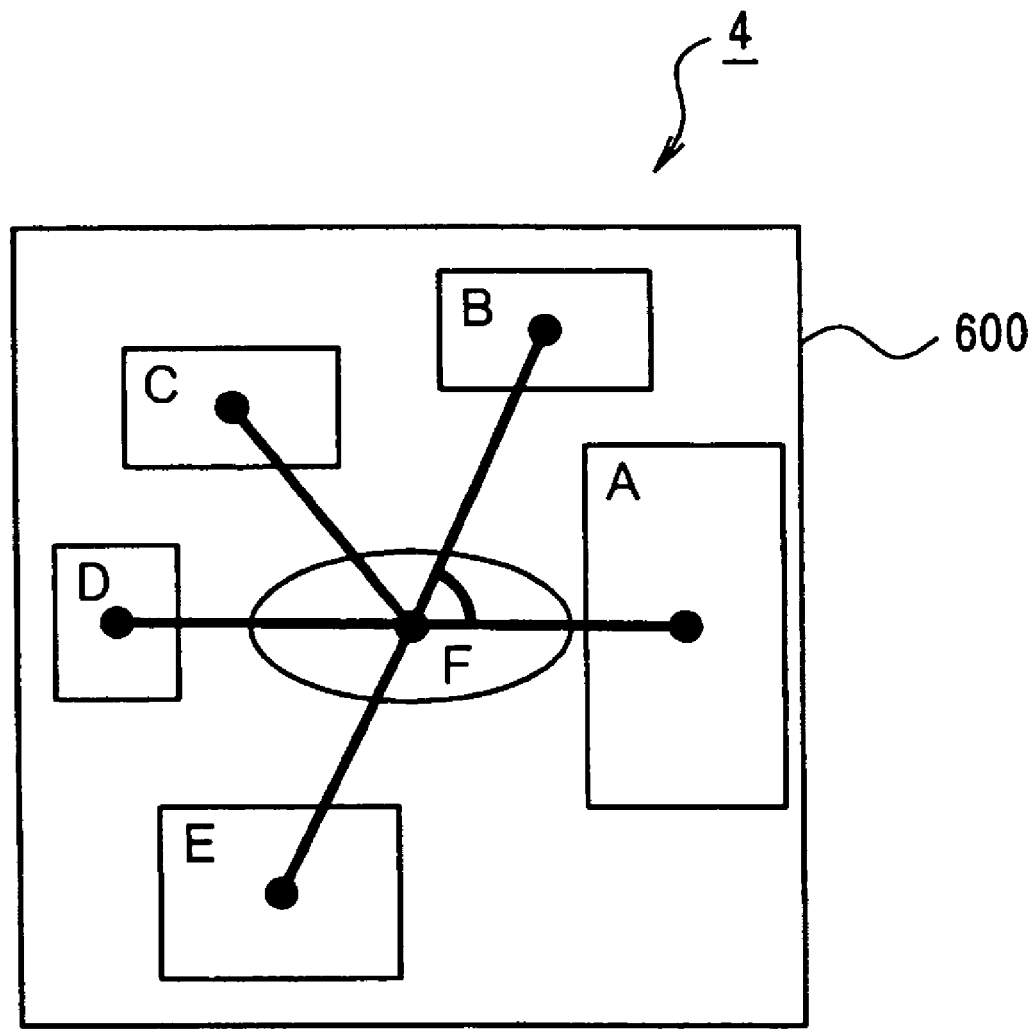
FIG. 20 is a diagram of a layout of the electronic document 4.

Generation of a layout rule from the electronic document 4 with the layout shown in FIG. 20 will next be described. FIG. 20 is a diagram of a layout of the electronic document 4.

As shown in FIG. 20, the electronic document 4 has five split regions A to E arranged in the layout region 600, as shown in FIG. 20. The split regions A to E are arranged at the center right, the upper right, the upper left, the center left, and the lower left of the layout region 600, respectively. A reference point F is taken in the vicinity of the center of the layout region 600.

In the layout unit 100, the distances and angles between the reference point F and the representative points of the split regions A to E of the electronic document 4 are calculated. The split regions A to E have the central points thereof as the representative points. Accordingly, the distances and angles between the representative points of the split regions A to E and the reference point F are calculated.

Figure 21:
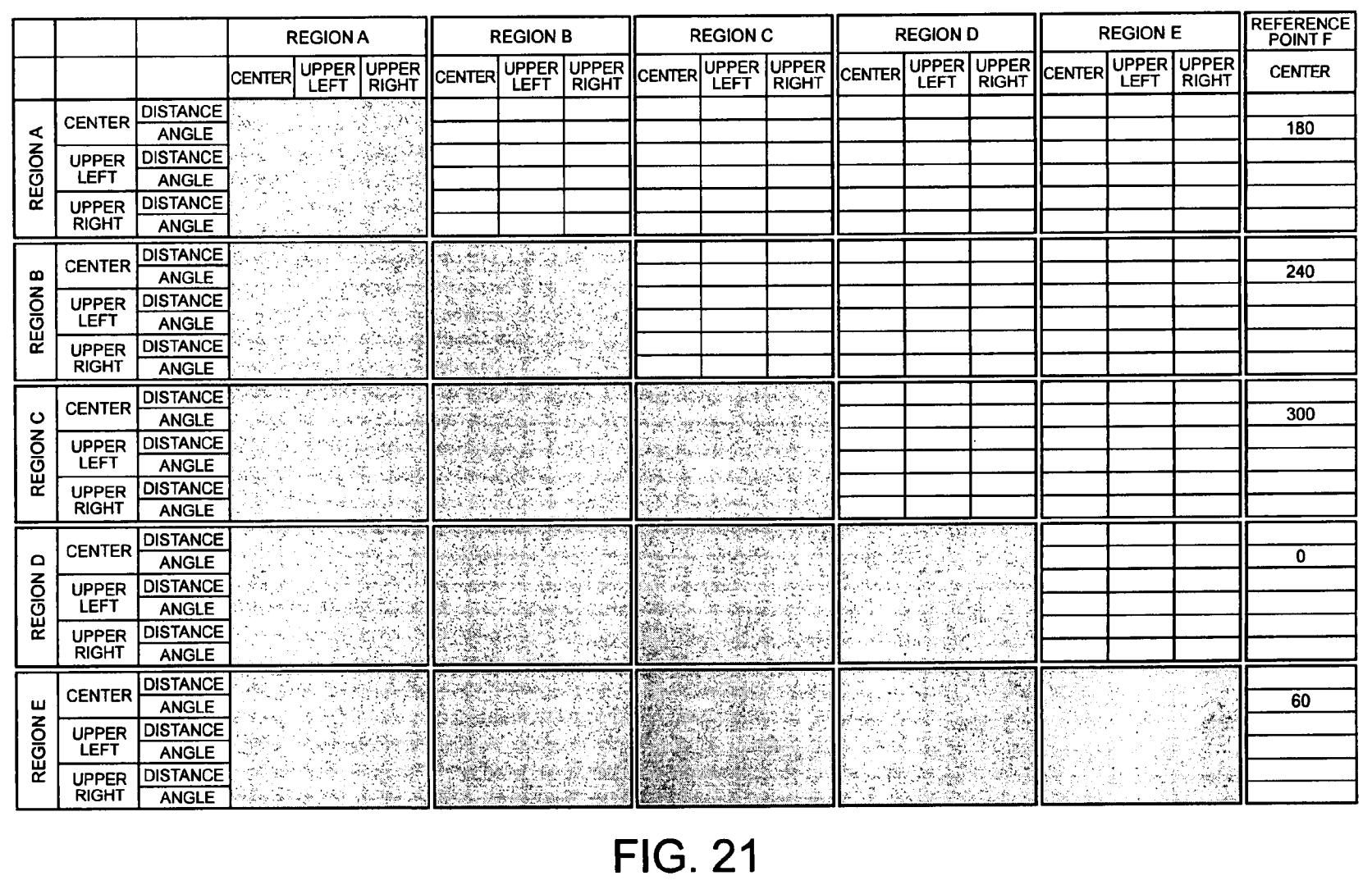

FIG. 21 is a diagram of the data structure of an inter-region analysis registration table. The distances and angles between the representative points calculated for the electronic document 4 of FIG. 20 are registered in an inter-region analysis registration table, as shown in FIG. 21.

In the inter-region analysis registration table of FIG. 21, the angles between the reference point F and the central points of the split regions A to E as the origins are calculated. These angles are converted to the angles between the reference point F as the origin and the central points of the split regions A to E. The conversion can easily be performed by equations (1) and (2), for example. In the equations (1) and (2), x is the angle between the reference point F and the central points of the split regions A to E as the origins, and y is the angle between the central points of the split regions A to E and the reference point F as the origin.

$$\text{when } x \geq 180, y = x - 180 \quad (1)$$

$$\text{when } x < 180, y = x + 180 \quad (2)$$

As a result, the angles between the reference point F and the central points of the split regions A to E are as follows: "0°" for the split region A, "60°" for the split region B, "120°" for the split region C, "180°" for the split region D, and "240°" for the split region E, which shows that the split regions are arranged at intervals of 60° around the reference point F. Accordingly, a determination is made in step S320 that the angles between virtual lines connecting a reference point selected from the layout region 600 and the representative points of at least three of the multiple split regions in the electronic document 4 are equal. Thus, a layout rule is generated in step S322 that specifies to arrange the layout elements to be laid out in the split regions A to E at an equal angle from the reference point F.

In this way, according to the exemplary embodiment, a layout rule is generated according to the positional relationship between at least two of the multiple split regions in the electronic document 4; a layout template is generated on the basis of the electronic document 4; layout elements are selected from the layout-element registration DB 20; and the selected layout elements are arranged in the layout region 600 according to the layout rule and the layout template generated for the same electronic document 4.

Thus, the layout rule applied to the electronic document 4 can be generated relatively easily. The layout of the electronic document 4 can be reflected to the result of automatic layout relatively properly.

Furthermore, in this exemplary embodiment, it is determined whether or not the virtual line connecting the representative points of two of the multiple split regions of the electronic document 4 is horizontal or vertical to the layout region 600, wherein when it is determined that the virtual line connecting the representative points of two split regions is horizontal or vertical, a layout rule is generated that specifies to align the layout positions of the layout elements to be arranged in the corresponding split regions.

Thus, a layout rule that specifies to align the layout positions of the layout elements can be generated relatively easily from the electronic document 4. The layout of the electronic document 4 can be reflected to the result of automatic layout in a more appropriate manner.

Furthermore, it is determined in this exemplary embodiment whether or not the representative points of at least three of the multiple split regions in the electronic document 4 are arranged on a straight line, wherein when it is determined that the representative points of at least three split regions are arranged on a straight line, a layout rule is generated that specifies to arrange the layout elements to be arranged in the corresponding split regions on a straight line.

Thus, a layout rule that specifies to arrange multiple layout elements on a straight line can be generated relatively easily from the electronic document 4. Also, the layout of the electronic document 4 can be reflected to the result of automatic layout in a more appropriate manner.

Furthermore, it is determined in this embodiment whether or not the distances between the representative point selected from the multiple split regions in the electronic document 4 and the representative points of at least two of the split regions other than the selected split region are equal, wherein when it is determined that the distances between the representative points are equal, a layout rule is generated that specifies to arrange the layout elements to be arranged in the corresponding split regions at an equal distance from the layout element arranged in the selected split region.

Thus, a layout rule that specifies to arrange multiple layout elements at an equal distance from a certain layout element can be generated relatively easily from the electronic document 4. Also, the layout of the electronic document 4 can be reflected to the result of automatic layout in a more appropriate manner.

Furthermore, it is determined in this embodiment whether or not the distances between a reference point selected from the layout region 600 and the representative points of at least three of the multiple split regions in the electronic document 4 are equal, wherein when it is determined that the distances between the reference point and the representative points are equal, a layout rule is generated that specifies to arrange the layout elements to be arranged in the corresponding split regions at an equal distance from the reference point.

Thus, a layout rule that specifies to arrange multiple layout elements at an equal distance from the reference point in the layout region 600 can be generated relatively easily from the electronic document 4. Also, the layout of the electronic document 4 can be reflected to the result of automatic layout in a more appropriate manner.

Furthermore, it is determined in this embodiment whether or not the angles between the virtual lines connecting the representative point selected from the multiple split regions in the electronic document 4 and the representative points of at least two of the split regions other than the selected split region are equal, wherein when it is determined that the angles between the virtual lines are equal, a layout rule is generated that specifies to arrange the layout elements to be arranged in the corresponding split regions at an equal angle from the layout element arranged in the selected split region.

Thus, a layout rule that specifies to arrange multiple layout elements at an equal angle with a certain layout element as the center can be generated relatively easily from the electronic document 4. Also, the layout of the electronic document 4 can be reflected to the result of automatic layout in a more appropriate manner.

Furthermore, it is determined in this embodiment whether or not the angles between the virtual lines connecting the reference point selected from the layout region 600 and the representative points of at least three of the multiple split regions in the electronic document 4 are equal, wherein when it is determined that the angles between the virtual lines are equal, a layout rule is generated that specifies to arrange the layout elements to be arranged in the corresponding split regions at an equal angle with the reference point as the center.

Thus, a layout rule that specifies to arrange multiple layout elements at an equal angle with a reference point in the layout region 600 as the center can be generated relatively easily from the electronic document 4. Also, the layout of the electronic document 4 can be reflected to the result of automatic layout in a more appropriate manner.

In the embodiment, layout elements are selected automatically from the layout-element registration DB 20. However, the invention is not limited to that but layout elements can be selected by the user.

Figure 22:
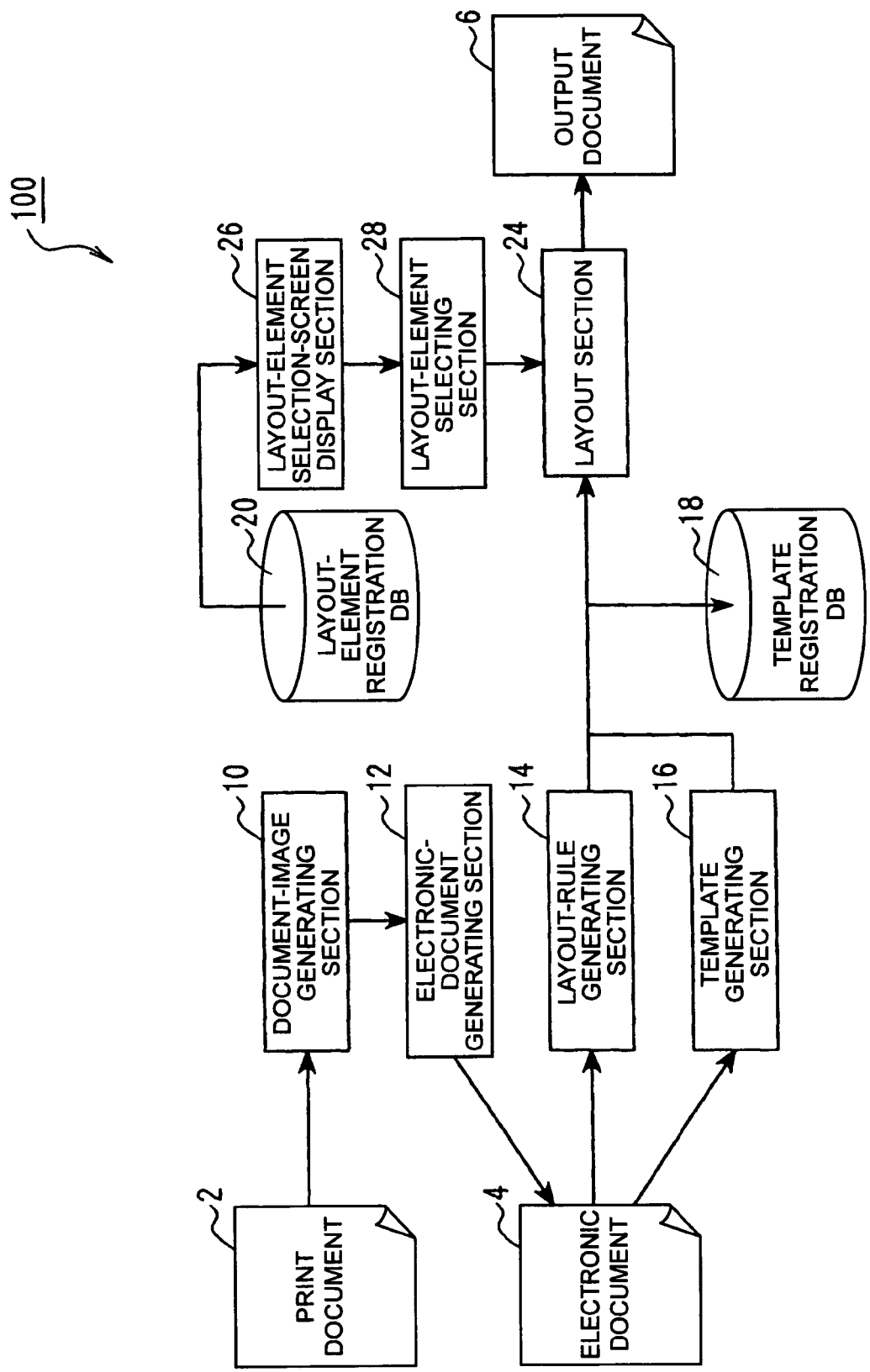
FIG. 22 is a functional block diagram of the functional outline of the layout unit 100.

FIG. 22 is a functional block diagram of the functional outline of the layout unit 100. As shown in FIG. 22, the layout unit 100 includes a layout-element selection-screen display section 26 for displaying a layout-element selection screen that displays layout elements to be selected from the layout-element registration DB 20 and a layout-element selecting section 28 for inputting the selection of the layout elements through the layout-element selection screen, in place of the layout-element selecting section 22 in the structure of FIG. 1.

Figure 23:
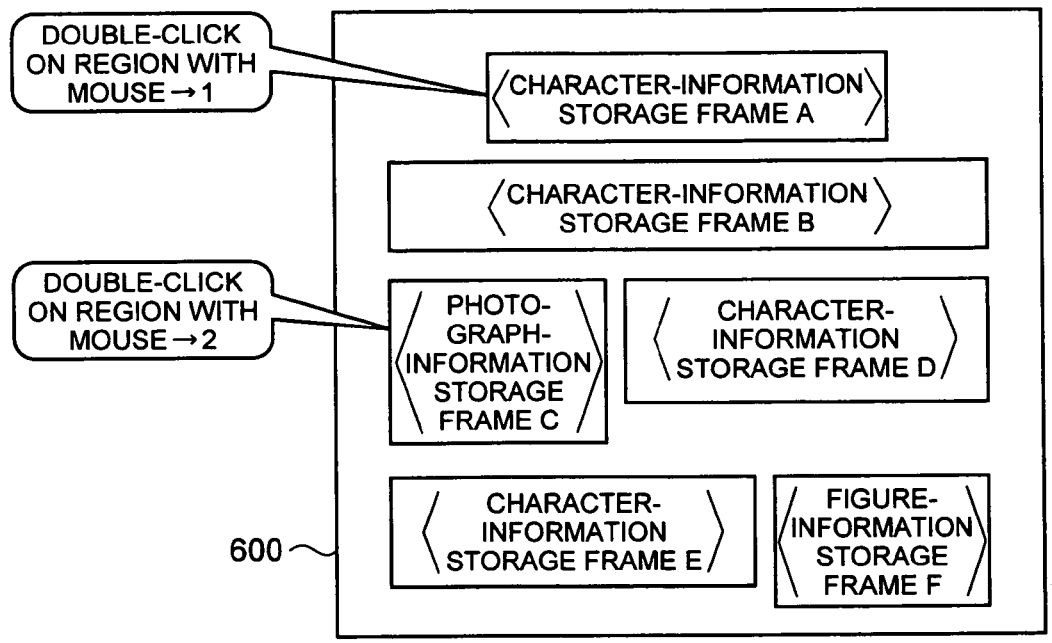
FIG. 23 is a diagram of a layout screen.

FIG. 23 is a diagram of the layout screen. As shown in FIG. 23, when the user makes a request for layout, a layout screen is displayed on the display unit 44 in which a character-information storage frame A, a character-information storage frame B, a photograph-information storage frame C, a character-information storage frame D, a character-information storage frame E, and a figure-information storage frame F are arranged in the layout region 600.

Figure 24:
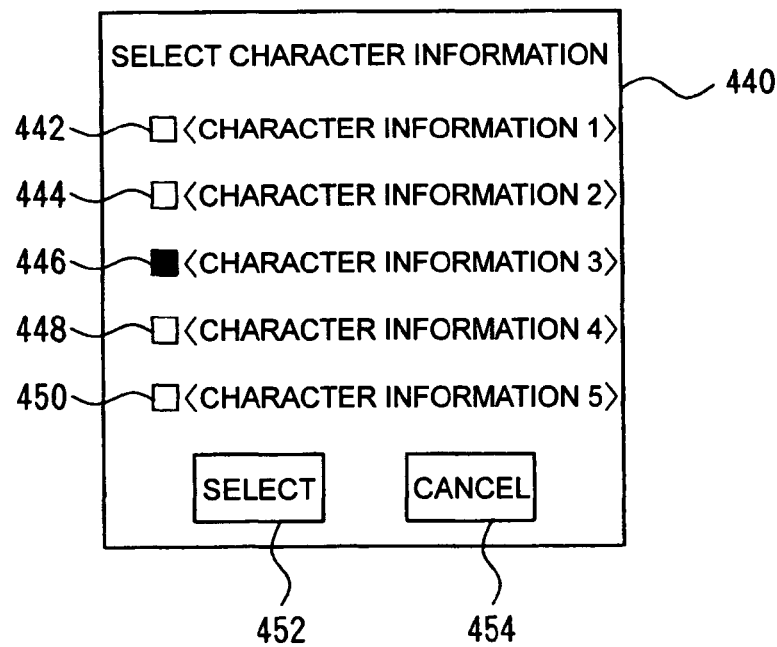
FIG. 24 is diagram of a layout-element selection screen.

FIG. 24 is diagram of the layout-element selection screen. When the user double-clicks on, e.g., the character-information storage frame A with a mouse etc. in the layout screen of FIG. 23, a layout-element selection screen 440 that shows a list of character information registered in the layout-element registration DB 20 is displayed on the display unit 44 by the layout-element selection-screen display section 26, as shown in FIG. 24. The layout-element selection screen 440 of FIG. 24 displays character information 1 to 5, check boxes 442 to 450 corresponding thereto, a selection button 452 for determining the selection of the character information, and a cancel button 454 for canceling the selection of the character information. The user clicks on one of the check boxes 442 to 450, which corresponds to character information that the user desires to store in the character-information storage frame A. For example, when the user clicks on the check box 446 and the selection button 452, the selection of character information 3 is inputted by the layout-element selecting section 28 through the layout-element selection screen 440.

Figure 25:
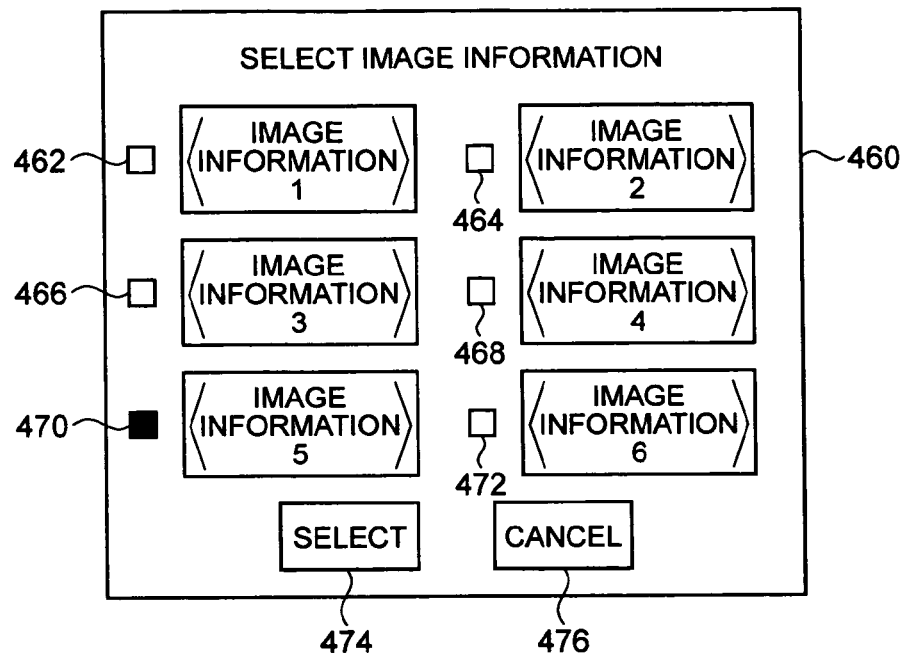
FIG. 25 is a diagram of a layout-element selection screen.

FIG. 25 is a diagram of a layout-element selection screen. When the user double-clicks on, e.g., the photograph-information storage frame C with a mouse, etc. in the layout screen of FIG. 23, a layout-element selection screen 460 that shows a list of image information registered in the layout-element registration DB 20 is displayed on the display unit 44 by the layout-element selection-screen display section 26, as shown in FIG. 25. The layout-element selection screen 460 of FIG. 25 displays image information 1 to 6, check boxes 462 to 472 corresponding thereto, a selection button 474 for determining the selection of the image information, and a cancel button 476 for canceling the selection of the image information. The user clicks on one of the check boxes 462 to 472, which corresponds to image information that the user desires to store in the photograph-information storage frame C. For example, when the user clicks on the check box 470 and the selection button 474, the selection of image information 5 is inputted by the layout-element selecting section 28 through the layout-element selection screen 460.

The layout section 24 lays out layout elements selected by the layout-element selecting section 28 in accordance with a layout template in the template registration DB 18 and a layout rule corresponding thereto and outputs its layout result as an output document 6.

In this case, the CPU 30 corresponds to the operation means of Invention 48; the input unit 40 corresponds to the input means of Invention 48; the layout-element selection-screen display section 26 corresponds to the layout-element presenting means of Invention 9; and the layout-element selecting section 28 corresponds to the layout-element selection means of Invention 9.

In the foregoing embodiment, how the result of layout of the layout elements is dealt is not described in particular. However, the layout result of the layout section 24 can be displayed on the display unit 44.

In this case, the display unit 44 corresponds to the output means of Invention 10.

The foregoing exemplary embodiment is constructed to determine whether or not the distances between the representative point of a split region selected from multiple split regions in the electronic document 4 and the representative points of at least two of split regions other than the selected split region are equal. However, it should be understood that the invention is not limited to that, but may be constructed to determine whether or not there is a split region having a representative point that is equally separated from the representative points of at least two of the multiple split regions in the electronic document 4. Technically, they are the same.

The foregoing embodiment is constructed to determine whether or not the distances between a reference point selected from the layout region 600 and the representative points of at least three of the multiple split regions in the electronic document 4 are equal. However, it should be understood that the invention is not limited to that but may be constructed to determine whether or not the layout region 600 has a reference point that is equally separated from the representative points of at least three of the multiple split regions in the electronic document 4. Technically, they are the same.

The foregoing exemplary embodiment is constructed to determine whether or not the angles between virtual lines connecting a reference point selected from the layout region 600 and the representative points of at least three of the split regions in the electronic document 4 are equal. However, it should be understood that the invention is not limited to that but may be constructed to determine whether or not the layout region 600 has a reference point in which the angles between virtual lines connecting the reference point and the representative points of at least three of the multiple split regions in the electronic document 4 are equal. Technically, they are the same.

In the foregoing exemplary embodiment, the central point, an upper left point, and an upper right point of the split region are set as representative points. However, it should be understood that the invention is not limited to that, but may be constructed such that another apex or central point of the split region is set as a representative point. Alternatively, the distribution of the degree of attention on the split region may be calculated, in which the most frequently viewed point of the split region can be set as a representative point.

In the foregoing exemplary embodiment, multiple representative points are set for one split region. However, the invention is not limited to that but only one representative point may be set for one split region.

The foregoing exemplary embodiment is constructed to generate a document image by reading the print document 2, generate the electronic document 4 from the generated document image, and use the generated electronic document 4. However, the invention is not limited to that but may use an electronic document 4 that is formed directly or an existing electronic document 4.

In the foregoing, the layout elements can include character information, photograph information, and figure information. However, the invention is not limit to that but may include other kind of elements, such as a big headline, a middle headline, a lead, an illustration, a caption, and a table.

The foregoing exemplary embodiment has the template registration DB 18 and the layout-element registration DB 20 as external units of the layout unit 100. However, the invention is not limited to that but may be constructed such that the template registration DB 18 and the layout-element registration DB 20 are provided at any terminals on a network, which may be connected with the layout unit 100 via the network so that the layout unit 100 uses the DBs 18 and 20 of the terminals.

In executing the processes shown in FIGS. 6 to 9 according to the embodiment, a control program stored in the ROM 32 is executed. However, the invention is not limited to that but the processes may be executed by reading the program into the RAM 34 from a storage medium that stores the program for the procedure, as shown in FIG. 26.

Figure 26:
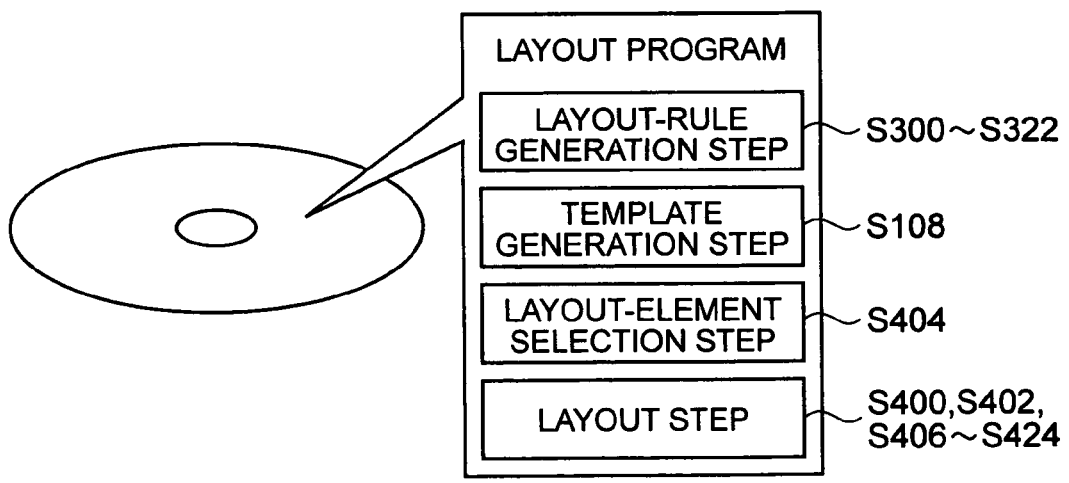
FIG. 26 is a diagram of a storage medium and its data structure.

FIG. 26 is an exemplary diagram of a storage medium and its data structure. Here the storage medium includes semiconductor storage media such as an RAM and ROM, magnetic storage media such as an FD and HD, optical-scan storage media such as a CD, CDV, LD, and DVD, and magnetic storage/optical-scan storage media such as an MO, which include any storage media that can be read by a computer irrespective of electronic, magnetic, or optical reading method.

The foregoing exemplary embodiment has been described for the case in which the system for generating a layout rule, the layout system, the program for generating a layout rule, the layout program, the storage medium, the method of generating a layout rule, and the layout method, according to the invention, are applied to the case of generating a layout rule from the electronic document 4, generating a layout template, and laying out layout elements according to the layout rule and the layout template, as shown in FIG. 1. However, it is to be understood that the invention is not limited to that, but may be applied to other cases without departing from the spirit and scope of the invention.

What is claimed is:

1. A layout-rule generation system that generates a layout rule on a basis of an electronic document in which a specified layout region is divided into a plurality of segmented regions, the system comprising:

a layout-rule generation device that generates a layout rule on the basis of a positional relationship between at least two of the plurality of segmented regions, each of the plurality of segmented regions including a layout element to be arranged therein, the specified layout region having two sides parallel to a first direction and two sides parallel to a second direction perpendicular to the first direction as outer periphery, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

2. A layout-rule generation system that generates a layout rule on a basis of an electronic document in which a specified layout region is divided into a plurality of segmented regions, the system comprising:

a layout-rule generation device that generates a layout rule on the basis of a positional relationship between at least two of the plurality of segmented regions, each of the plurality of segmented regions including a layout element to be arranged therein, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

3. A layout system that lays out layout elements in accordance with a layout template that specifies the layout of a predetermined layout region, the system comprising:

a template generation device that generates the layout template on a basis of an electronic document in which the layout region is segmented into a plurality of segmented regions;

a layout-rule generation device that generates a layout rule on a basis of a positional relationship between at least two of the plurality of segmented regions;

a layout-element storage device that stores a plurality of the layout elements;

layout-element selection device that selects layout elements from the layout-element storage device;

a layout device that lays out the layout elements selected by the layout-element selection device; and the layout device arranging the layout elements in the layout region according to the layout rule generated by the layout-rule generation device and the layout template generated by the template generation device for the same electronic document, each of the plurality of segmented regions including a layout element to be arranged therein, the predetermined layout region having two sides parallel to a first direction and two sides parallel to a second direction perpendicular to the first direction as outer periphery, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

4. The layout system according to claim 3, further comprising;
an output device that outputs a result of layout by the layout device.

5. A layout system for laying out layout elements in accordance with a layout template that specifies the layout of a predetermined layout region, the system comprising:
a template generation device that generates a layout template on a basis of an electronic document in which the layout region is segmented into a plurality of segmented regions;
a layout-rule generation device that generates a layout rule on a basis of a positional relationship between at least two of the plurality of segmented regions;
a layout-element storage device that stores a plurality of the layout elements;
a layout-element presentation device that presents the layout elements in the layout-element storage device for selection of any of them;
a layout-element selection device that inputs a selection of the layout elements;
a layout device that lays out the layout elements selected by the layout-element selection device; and
the layout device arranging the layout elements in the layout region according to the layout rule generated by the layout-rule generation device and the layout template generated by the template generation device for the same electronic document,
each of the plurality of segmented regions including a layout element to be arranged therein,
the predetermined layout region having two sides parallel to a first direction and two sides parallel to a second direction perpendicular to the first direction as outer periphery, and
in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions,
in a case that it is determined that representative points of at least three of the plurality of segmented regions are arranged on a straight line, the layout-rule generating device generating a second layout rule that specifies to arrange the layout elements to be arranged in the corresponding segmented region on a straight line,
in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region,
in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference point,
in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and
in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

6. A layout system that lays out layout elements in accordance with a layout template that specifies the layout of a predetermined layout region, the system comprising:
a template generation device that generates the layout template on a basis of an electronic document in which the layout region is segmented into a plurality of segmented regions;
a layout-rule generation device that generates a layout rule on a basis of a positional relationship between at least two of the plurality of segmented regions;
a layout-element storage device that stores a plurality of the layout elements;
layout-element selection device that selects layout elements from the layout-element storage device;
a layout device that lays out the layout elements selected by the layout-element selection device; and
the layout device arranging the layout elements in the layout region according to the layout rule generated by the layout-rule generation device and the layout template generated by the template generation device for the same electronic document,
each of the plurality of segmented regions including a layout element to be arranged therein, and
in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions,
in a case that it is determined that representative points of at least three of the plurality of segmented regions are arranged on a straight line, the layout-rule generating device generating a second layout rule that specifies to arrange the layout elements to be arranged in the corresponding segmented region on a straight line,
in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

7. A non-transitory computer readable medium storing a computer readable program executable by a computer for causing the computer to perform a process of laying out layout elements according to a layout template that specifies the layout of a predetermined layout region, the process comprising:

generating the layout template on a basis of an electronic document in which the layout region is segmented into a plurality of segmented regions;

generating a layout rule on the basis of the positional relationship between at least two of the plurality of segmented regions;

selecting the layout elements from a layout-element storage device that stores a plurality of the layout elements;

laying out the layout elements selected in selecting the layout elements; and in laying out the layout elements, the layout elements being arranged in the layout region according to the layout rule generated in generating a layout rule and the layout template generated in generating the layout template for the same electronic document, each of the plurality of segmented regions including a layout element to be arranged therein, the predetermined layout region having two sides parallel to a first direction and two sides parallel to a second direction perpendicular to the first direction as outer periphery, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

8. A non-transitory computer readable medium storing a computer readable program executable by a computer for causing the computer to perform a process of laying out layout elements according to a layout template that specifies the layout of a predetermined layout region, the process comprising:

generating the layout template on a basis of an electronic document in which the layout region is segmented into a plurality of segmented regions;

generating a layout rule on a basis of the positional relationship between at least two of the plurality of segmented regions;

presenting the layout elements in a layout-element storage unit that stores a plurality of the layout elements for selection of any of them;

inputting the selection of the layout elements;

laying out the layout elements selected in inputting the selection of the layout elements; and in laying out the layout elements, the layout elements being arranged in the layout region according to the layout rule generated in generating a layout rule and the layout template generated in generating the layout template for the same electronic document, each of the plurality of segmented regions including a layout element to be arranged therein, the predetermined layout region having two sides parallel to a first direction and two sides parallel to a second direction perpendicular to the first direction as outer periphery, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

9. A layout-rule generation method of generating a layout rule on a basis of an electronic document in which a predetermined layout region is segmented into a plurality of segmented regions, the method comprising:

a layout-rule generation step in which an operation device generates a layout rule on a basis of a positional relationship between at least two of the plurality of segmented regions, each of the plurality of segmented regions including a layout element to be arranged therein, the predetermined layout region having two sides parallel to a first direction and two sides parallel to a second direction perpendicular to the first direction as outer periphery, and in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions, in a case that it is determined that representative points of at least three of the plurality of segmented regions are arranged on a straight line, the layout-rule generating device generating a second layout rule that specifies to arrange the layout elements to be arranged in the corresponding segmented region on a straight line, in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

10. A layout method of laying out layout elements according to a layout template that specifies a layout of a predetermined layout region, the method comprising:
- a template generation step in which an operation device generates the layout template on a basis of an electronic document in which the layout region is segmented into a plurality of segmented regions;
- a layout-rule generation step in which the operation device generates a layout rule on a basis of a positional relationship between at least two of the plurality of segmented regions;
- a layout-element selection step in which the operation device selects the layout elements from the layout-element storage device that stores a plurality of the layout elements;
- a layout step in which the operation device lays out the layout elements selected in the layout-element selection step; and
- in the layout step, the layout elements being arranged in the layout region according to the layout rule generated in the layout-rule generation step and the layout template generated in the template generation step for the same electronic document,
- each of the plurality of segmented regions including a layout element to be arranged therein,
- the predetermined layout region having two sides parallel to a first direction and two sides parallel to a second direction perpendicular to the first direction as outer periphery, and
- in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions,
- in a case that it is determined that representative points of at least three of the plurality of segmented regions are arranged on a straight line, the layout-rule generating device generating a second layout rule that specifies to arrange the layout elements to be arranged in the corresponding segmented region on a straight line,
- in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region,
- in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region,
- in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and
- in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

11. A layout method of laying out layout elements according to a layout template that specifies the layout of a predetermined layout region, the method comprising:
- a template generation step in which an operation device generates the layout template on the basis of an electronic document in which the layout region is segmented into a plurality of segmented regions;
- a layout-rule generation step in which the operation device generates a layout rule on a basis of a positional relationship between at least two of the plurality of segmented regions;
- a layout-element presentation step in which the operation device presents the layout elements in the layout-element storage device that stores a plurality of the layout elements for selection of any of them;
- a layout-element selection step in which an input device inputs the selection of the layout elements;
- a layout step in which the operation device lays out the layout elements selected in the layout-element selection step; and
- in the layout step, the layout elements being arranged in the layout region according to the layout rule generated in the layout-rule generation step and the layout template generated in the template generation step for the same electronic document,
- each of the plurality of segmented regions including a layout element to be arranged therein,
- the predetermined layout region having two sides parallel to a first direction and two sides parallel to a second direction perpendicular to the first direction as outer periphery, and
- in a case that it is determined that a virtual line connecting representative points of two of the plurality of segmented regions is horizontal or vertical to the layout region, the layout-rule generating device generating a first layout rule that specifies to align layout positions of layout elements to be arranged in the corresponding segmented regions,
- in a case that it is determined that representative points of at least three of the plurality of segmented regions are arranged on a straight line, the layout-rule generating device generating a second layout rule that specifies to arrange the layout elements to be arranged in the corresponding segmented region on a straight line,
- in a case that a segmented region is selected in sequence from the plurality of segmented regions and it is determined that distances between a representative point in the selected segmented region and representative points of at least two of the plurality of segmented regions other than the selected segmented region are equal, the layout-rule generating device generating a third layout rule that specifies to arrange the layout elements to be arranged in the corresponding segmented regions at an equal distance from a layout element arranged in the selected segmented region, in a case that a reference point is selected in sequence from the layout region and it is determined that distances between the selected reference point and representative points of at least three of the plurality of segmented regions are equal, the layout-rule generating device generating a fourth layout rule that specifies to arrange the layout elements to be arranged in the corresponding segmented regions at an equal distance from a reference region, in a case that a segmented region is selected in sequence from the plurality of segmented regions and it is determined that angles between virtual lines connecting a representative point of the selected segmented region and representative points of at least two of the segmented regions other than the selected segmented region are equal, the layout-rule generating device generating a fifth layout rule that specifies to arrange layout elements to be arranged in the corresponding segmented regions at an equal angle with the layout element arranged in the selected segmented region as a center, and in case a reference point is selected in sequence from the layout region and it is determined angles between virtual lines connecting the selected reference point and representative points of at least three of the plurality of segmented regions are equal, the layout-rule generating device generating a sixth layout rule that specifies to arrange layout elements to be arranged in the corresponding segmented regions at an equal angle with the reference point as a center.

* * * * *